(12) United States Patent
Chang

(10) Patent No.: US 7,508,868 B2
(45) Date of Patent: Mar. 24, 2009

(54) SYSTEMS AND METHODS FOR TESTING THE PERFORMANCE OF AND SIMULATING A WIRELESS COMMUNICATION DEVICE

(75) Inventor: Paul C. Chang, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 587 days.

(21) Appl. No.: 11/293,631

(22) Filed: Dec. 2, 2005

(65) Prior Publication Data

US 2007/0127559 A1    Jun. 7, 2007

(51) Int. Cl.
H04B 3/46   (2006.01)
H04B 17/00  (2006.01)
H04Q 1/20   (2006.01)

(52) U.S. Cl. .................. 375/224; 455/423; 455/67.11; 455/115.1; 455/226.1; 379/27.01; 379/29.02

(58) Field of Classification Search ................. 375/224, 375/227, 228, 285, 346–347; 455/423, 504, 455/501, 65.11, 115.1, 226.1, 226.2, 226.3, 455/296; 379/26.01, 27.01, 27.03, 29.02
See application file for complete search history.

(56) References Cited

U.S. PATENT DOCUMENTS

| | | | | |
|---|---|---|---|---|
| 5,794,128 | A * | 8/1998 | Brockel et al. | 455/67.11 |
| 6,058,261 | A * | 5/2000 | Rapeli | 703/6 |
| 6,236,363 | B1 * | 5/2001 | Robbins et al. | 342/360 |
| 6,308,064 | B1 * | 10/2001 | Green | 455/423 |
| 6,308,072 | B1 * | 10/2001 | Labedz et al. | 455/448 |
| 6,571,082 | B1 * | 5/2003 | Rahman et al. | 455/67.11 |
| 6,831,943 | B1 * | 12/2004 | Dabak et al. | 375/147 |
| 7,013,257 | B1 * | 3/2006 | Nolan et al. | 703/28 |
| 7,286,802 | B2 * | 10/2007 | Beyme et al. | 455/67.14 |
| 7,324,588 | B2 * | 1/2008 | Green et al. | 375/224 |
| 2003/0236089 | A1 * | 12/2003 | Beyme et al. | 455/423 |
| 2004/0160902 | A1 * | 8/2004 | Gronberg | 370/252 |

OTHER PUBLICATIONS

Aguado et al., "Indoor and Outdoor Channel Simulator Based on Ray Tracing", Vehicular Tech. Cof. of 1997, IEEE 4th, vol. 3, 1997, pp. 2065-2069.
Arai, Hiroyuki, "Field Simulator for Rayleigh/Rician Fading Reproduction", Proc of IEEE APS Inter. Sym, Baltimore, Jul. 1996, pp. 1218-1221.

(Continued)

Primary Examiner—Jean B Corrielus

(57) ABSTRACT

A system abstracts channel information from field data gathered in actual wireless communication system environments. The abstracted data is then transformed into control signals or programming codes that can be used to control channel simulators so as to recreate the field conditions, including path loss, slow fading, fast fading, path delay, fading power spectral density with and without line-of-sight (LOS), and different kind of handoff scenarios, such as soft, softer, intra-band hard, inter-band hard handoffs. The system thus can accurately simulate a realistic wireless communication link originated from multiple signal sources in different band channels and formed by multipath signal propagation. The simulated realistic wireless communication link can be condensed by selecting the most useful scenarios from its original field data files or modified by tuning its parameters as desired.

75 Claims, 9 Drawing Sheets

OTHER PUBLICATIONS

EDN Access, "RF-channel simulators bring reality's challenges to your prototype", www.ednmag.com/reg/1998/091198/19cs.cfr, Sep. 11, 1998.

Kim et al., "Improving Idle Handoff in CDMA Mobile Systems", IEEE Communications Letters, vol. 2, No. 11, Nov. 1998, pp. 304-306.

Mastrangelo et al., "A New Wideband High Frequency Channel Simulation System", IEEE Transactions on Commun, Vo. 45, No. 1, Jan. 1997, pp. 26-34.

Ohnishi et al., "Field Simulator for Testing Handset Under Multipath Propagation Environ.", IEEE APS Int'l, Sym, Canada, Jul. 1997, pp. 2584-2587.

Perez et al., "Efficient Ray Tracing Algorithms for Planning of Picocellular Sys. in Urban & Indoor Environments," IEEE Ray-Tracing Tech, pp. 436-449, 1996.

PROPSim, product: PropSound Key Features, www.etektrobit.com, Mar. 18, 2002.

Rappaport et al., Statistical Channel Impulse Response Models for Factory & Open Plan Building Radio Communication System Design, IEEE Trans on Comm, vol. 39, No. 5, pp. 794-806, May 1, 1991.

Rappaport et al., Wireless Communications, Prentice Hall PTR, Upper Saddle River, New Jersey 07458, www.prenhall.com, Ch. 4, pp. 189-193, Jan. 15, 1996.

TAS 4500, RF Channel Emulator, Operations Manual, pp. 2-3, Jul. 5, 2000.

\* cited by examiner

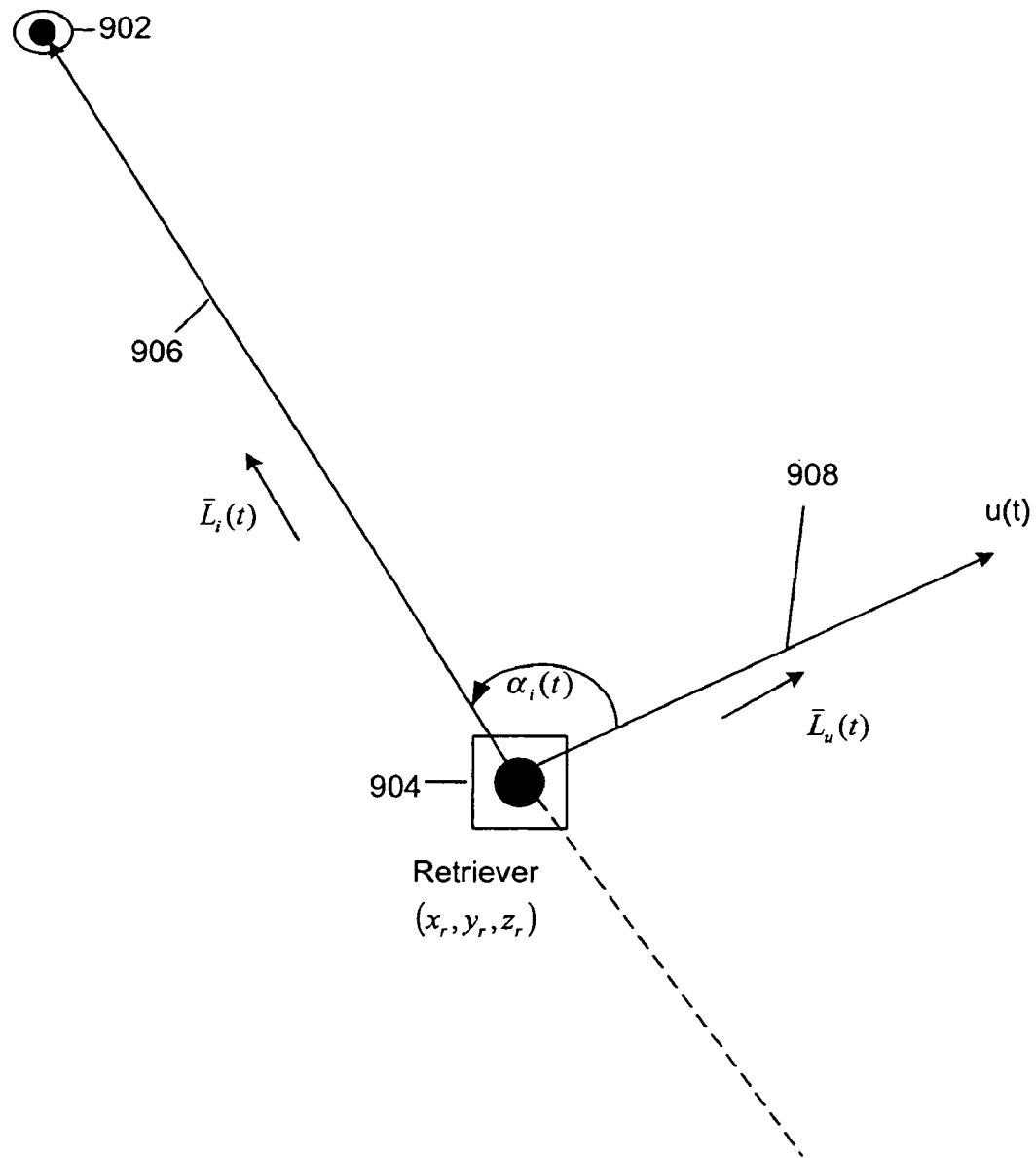

SYSTEMS AND METHODS FOR TESTING THE PERFORMANCE OF AND SIMULATING A WIRELESS COMMUNICATION DEVICE

BACKGROUND OF THE INVENTION

1. Field of the Invention

The invention relates generally to wireless communication and more particularly to systems and methods for ensuring adequate performance of a wireless communication device within a wireless communication system.

2. Background

Before a wireless communication device leaves the factory for deployment in a wireless communication system, it is tested to ensure it complies with all system performance requirements. Such a device must not only be tested to ensure that it performs when RF propagation conditions are optimal, but also when conditions are poor as well as when multiple RF sources exist. This means that the device must be tested to ensure that it performs even when fading and path loss are present in all possible propagation paths, with delay spread and fading power spectrum, between the device and the multiple RF sources. Further, the device must be tested for both Line of Sight (LOS) signals and non-LOS signals.

Multipath can best be described as the result of reflection, diffraction, and scattering, by bodies, such as buildings 106, mountains 108, etc., of a signal 102 transmitted from a base station transmitter 104 to a device 110 in a communication system 100 as illustrated in FIG. 1. When signal 102 is transmitted, it is broadcast within the communication cell, or sector, defined by the particular base station transmitter 104 and/or base station antenna 104a being used. Thus, signal 102 begins to travel along a propagation path 112 toward device 110. As signal 102 travels along propagation path 112, it will encounter bodies 106 and/or 108. By reflection, diffraction, and scattering, these bodies 106 and 108 will redirect portions of the energy comprising signal 102 along different paths, e.g., propagation paths 114, 116, and 118. Some or all of the signals traveling along these new paths will reach device 110 along with signal 102 traveling along path 112.

For purposes of this specification path 112 is termed the primary path, while paths 114, 116, and 118 are termed multipaths. Similarly, a signal traveling along primary path 112 is termed the specular signal or the LOS signal, while signals traveling along multipaths 114, 116, and 118 are termed multipath signals or simply multipaths. To eliminate any confusion, when the term multipath, or multipaths, is used in this specification and the claims that follow, it will be understood that the actual signal is being referred to, as opposed to the signal path, unless otherwise indicated.

When the multipaths reach device 110, they will combine with specular signal 102 travelling along path 112. In complicated wireless systems, such as a commercial IS-95 compliant cellular communication system, the signal sources of received multipaths could have originated from more than one base station. In a static multipath situation, the multipaths have traveled along different paths and will be delayed and attenuated with respect to the primary path and the original signal intensity, respectively. Thus the delay spread of the multipaths at the receiver causes the received multipath signals to be phase shifted with respect to received specular signal 102 travelling along path 112 as well as with each other.

In a dynamic multipath situation, the receiver, e.g., the receiver in device 110, is moving in propagation field, which causes a time variation of each multipath length. Here, the rate of path change for any particular multipath is related to the velocity of the receiver and the angle between the moving direction and that multipath, which is indirectly related to the Doppler frequency shift.

As a result of both static and dynamic fading, the multipaths will combine destructively and constructively in the receiver of device 110, forming a RF signal with a randomly changing envelope and phase. This prevents, or makes difficult, reception of specular signal 102. The effect described is termed fast fading and is a serious problem in all wireless communication systems. Fast fading of a non-LOS signal, called Rayleigh fading, it more severe in terms of the distributed envelope than fast fading of a LOS signal. The later situation is referred to as Rician Fading. Thus, it is more difficult to detect the already weak non-LOS signals in a wireless communication system.

The multipath interference also causes the fading of received signal components in the frequency domain. This fading, sometimes called Power Spectral Density (PSD) fading, is associated with fast fading and Doppler shift described above. PSD fading must be considered when designing and/or testing devices for use in some wireless communication systems, e.g. in an IS-95 compliant communication system. Some communication systems attempt to separate and filter out the multipaths in the receiver, others attempt to use the energy contained in the multipaths to increase the sensitivity and performance of the receiver, e.g., the Rake receiver adopted in IS-95 complaint system. Regardless of the approach used, however, device 110 must be tested before it leaves the factory to ensure that it will perform even in the presence of multipaths.

There are other factors that contribute to a received signal's fading, attenuation, and delay, which are due to poor radio signal propagation conditions. These factors include mean path loss, i.e., the mean signal attenuation versus distance and slow fading, also called shadow fading or log-normal fading, which is due in part to changing terrain contours. The measured mean path loss can introduce 6~8 dB variations to the theoretically predicted mean path loss in one signal source case. Further, fast fading can superimpose up to +10~−30 dB of variation onto the slow fading variations when there is no LOS or specular signal 102 component present.

In addition, the presence of multiple sectors and many base stations with the same or different carry frequencies within the wireless communication system can complicate the operation of a wireless communication device. For example, in an IS-95 compliant system, the receiver in a wireless communication device constantly searches for pilot signals from sectors other than the one with which it is currently communicating. If the strength of one these other pilot signals exceeds the strength of the pilot from the current sector by a predetermined amount, then the device will "handoff" to the new sector. In order to manage handoffs effectively, the device must be able to accurately determine the pilot signal strengths. Otherwise, the device will either make unnecessary handoffs or fail to make necessary handoffs. Both of which lead to poorer device and/or system performance. Therefore, the device must be tested to ensure that it can make accurate signal strength determinations in the face of signals from a plurality of sectors even when fading is present.

Accordingly, in order to test a wireless communication device in the factory, fading and handoff conditions must be simulated. Unfortunately, realistic RF fading is very difficult to artificially simulate due to the number of different factors that effect fading and the unpredictable nature of these factors.

Presently a conventional method to simulate RF fading in the lab is static and empirical, i.e., it involves presetting parameters for mean path loss, fast fading, slow fading, and Doppler shift for a channel simulator, or fader, that are based on empirical results. The preset parameters in most cases are time independent. For example, in the CDMA 2000 1× standard document TIA/EIA 98D, Rayleigh fading scenarios are designed to be imposed on each of a maximum of 3 paths per channel in the lab. The model parameters for Rayleigh fading are predefined as 3, 8, 14, 30, 100 km/s, depending on the configuration (see Section 3.4.2, 3.4.7, 3.4.8, 3.4.9, 3.4.10 of the above specification). In the GSM Recommendation V3.5.0, on the other hand, 6 paths in one or two RF channels are faded by Rayleigh or Rician models, which also are superimposed on a log-normal fading model to mimic a rural, hilly, or urban terrain.

In both the CDMA 2000 1× and GSM examples, the predefined fast fading parameters wouldn't be changed during an entire test period for a given configuration. Real world fading scenarios, however, are neither static, nor in complete accordance with Rayleigh or Rician fading models. As measured data from the field has demonstrated, LOS and non-LOS signal areas randomly appear over time or distance as a receiver moves through a wireless communication environment. This means that a static, single fast fading math model does not represent realistic fading scenarios. Further, field data has indicated that the received baseline power dramatically changes with time. Thus, a high error margin must be added into conventional shadow fading math models, which is not considered in existing specifications such as the CDMA 2000 1X specification.

Two approaches have been considered to simulate realistic fading propagation in the lab. The first approach is based on the time-varying impulse response of a radio channel as measured by various radio channel sounding systems. A typical example is Electrobit Group's product PROPSound™, which employs a spread spectrum (SS) sounding method for the delay domain measurement. The measured data is further treated by some mathematical models. The treated data is presented in terms of propagation path delay, complex amplitude, Doppler shift, and azimuth/elevation angle, which is recreated by a channel simulator. While this approach can provide an instant picture of the channel properties between a transmitter and receiver, for example, its application is widely limited.

The limitations include the fact that a fundamental assumption in radio channel sounding is to consider the radio channel between a transmitter and a receiver as a time-varying filter. Thus, the radio channel's properties are fully disclosed by the filter's pulse response in the delay domain. The sounding measurement must use a RF transmitter and a RF receiver to carry out delay domain testing. Unfortunately, for a well established wireless communications system consisting of multiple base stations comprising multiple sectors and that has been in daily operation, it is typically impossible to allow any sounding measurements to be carried out in the field. As a result, today's sounding techniques are most applicable for exploring new frequency bands or new wireless application areas that are not in service.

Another limitation is the changing nature of wireless communication systems. Field measurements have demonstrated that due to the fast growth of wireless services, wireless network planners are forced to swiftly modify and add new base stations/sectors to existing wireless systems. Thus, measurements of radio channel properties, obtained through conventional sounding techniques, are only accurate for a short period of time before the wireless system is modified.

Another limitation is the fundamental challenge to any sounding base technique that is posed by IS-95 type systems.

As mentioned above, fast fading and fading power spectrum properties are caused by multipath interference. The multipath signals in an IS-95 compliant system, however, actually are originated not from one source, but from many sources. This is because multiple base stations and their sectors can share the same carrier frequency in the same geographic area. Thus, multipath fading properties result from many multiple paths, and each channel's multipath must be described by a series of time-varying variables that depend on that channel's multipath conditions and the receiver's movement. In order to simulate a realistic fading environment, the sounding technique must be capable of synchronously measuring the channel properties for each channel and each base station and their sectors. The system must also be able to synthesize each channel's fading properties as seen by the receiver. These challenges are very expensive for existing channel sounding system to overcome, if it is even possible to do so.

The second approach to realistic fading simulation can be described as reverse engineering based on the First Principle of fading theory. Unfortunately, this approach also suffers from some fundamental limitations. First, for any reverse engineering process, the first step must be to abstract all fading information from the field propagation data (Abstraction Stage). The second step includes the recreation of the fading propagation based on the abstracted information to a controlled environment (Recreation Stage).

For the Abstraction Stage, some approaches separate fading into different signal components based on tiered theoretical fading models, and then find the model's parameters to describe these components. For example, when one base station is operated in a narrow band system, one approach takes RF signal versus time information 208 gathered in the field and separates it into three main components as illustrated in the graph of FIG. 2A. These components include the mean path loss 202, which is due to dispersion and is inversely, and exponentially proportional to the distance traveled; fast fading 204, which is due in part to the multipath effects described above; and slow fading 206. Also, in the frequency domain, the interference between multipaths coupled with the Doppler effect, caused by the device's relative movement to the base station, results in PSD fading 209 illustrated in FIG. 2B. As can be seen, PSD fading 209 is increased from its carry frequency ($f_c$) location to a maximum at ($f_c \pm f_m$), where ($f_m$) is the Doppler frequency.

It can also be seen that, the fast fading component 204 superimposes a large variation, e.g., maximum +10~−30 dB, onto the slow fading variations 206, which can vary by 6~10 dB around the mean path loss 202. In the frequency domain, the maximum PSD shift is dependent on the Doppler frequency ($f_m$) in both Rayleigh and Rician fading cases. Further, the existence of a LOS signal in Rician fading also introduces a peak signal 210 at $f_D$, where ($f_c-f_m$)<$f_D$<($f_c+f_m$).

Next, some parameters associated with each component must be abstracted out of the data. For example, the parameter d and n in the term $1/d^n$, where d is the distance traveled at a given time t and n is 2 for free space but typically between 3 to 5 for wireless communication systems, must be found for the mean path loss 202. A series of parameters based on the contour and transmitter antenna sizes as well as other parameters associated with slow fading component 206 must also be abstracted. The velocity of the receiver relative to the base station, and whether a LOS signal is present must also be found for fast fading components 204 and 209.

In the Recreation Stage, once the parameters are defined, then they can be used to form a series of computer codes to feed to a channel simulator, or fader. The function of the fader is to modulate a test RF signal from a base station or a base station emulator. Thus, one test signal is faded in the time and frequency domains. This is illustrated in FIG. 3. Fader 310 is controlled by a computer 312, which provides Fader 310 with codes developed from the parameters associated with components 202, 204, 206, 209 and 210. A test signal 300 is shown in both the time (t) and frequency (f) domains, is modulated by fader 310 resulting in a signal 308 that comprises the components 302, 304, 306, 309, and 310. Signal 308 can also be combined with other modulated test signals to recreate an artificial fading environment for testing a wireless communication device.

In realty, however, it is very difficult to accurately create a realistic RF environment using the reverse engineering approach, described in relation to FIGS. 2 and 3. The difficulty results from several inherent limitations. The first and also the most difficult limitation to overcome is how to find the right time boundaries for recorded RF signals such that the meaningful parameters of fading theory can be assigned to each component within the boundaries. It has been found that the time boundaries for each fading component are different. In a slow fading situation, for example, all slow fading statistical models are highly dependent on the contours of the surrounding terrain. Thus, in order to abstract the parameters for a slow fading model, the time boundaries in the data file must first be determined. Then the unique contour characteristics must be found.

Suppose a slow fading time boundary spans from $(t_1)$ to $(t_2)$ and includes meaningful parameters $(a_1, a_2, \ldots)$, and from $(t_3)$ to $(t_4)$ including parameters $(b_1, b_2 \ldots)$, while for the same time period $(t_1)$ to $(t_4)$ the device experiences a couple of Rician fading peaks, each with a LOS signal. The overlapping boundary phenomena make any meaningful separation of the fading components impossible.

Another limitation is the very high error margin, as high to 6~8 dB, that exists between the measured data and mathematical mean path loss models in wireless communication systems. Thus, during the Abstraction Stage, one set of accurately abstracted mean path loss parameters within a pair of particular time boundaries is most likely useless for all other time boundaries, not to mention for other log files obtained along the same path but at a different time. This makes any attempt to separate the RF baseline from the fading signals very difficult.

Still another limitation is that in Spread Spectrum (SS) wireless system, such as IS-95 compliant systems the same carry frequency can be reused in all neighboring cells. This means that the field recorded data is not only affected by the RF signals originated from one sector, but rather it is effected by the signals originated from two or more sectors. The number of sectors that actually contribute is case dependent and a function of the given locations. Thus, for a given time (t), the factors that contribute to the recorded data include the location of test device in the field, the channel conditions between the test device and surrounding sectors, the RF transmission conditions from each of the sectors, the spectrum reuse arrangement used by the service provider, etc. Without partitioning to separate each sector's contribution to the received RF signals, any attempt to abstract the parameters to generate fading models that describe each path's propagation is useless.

Thus, one can conclude that the reverse engineering process described above is highly limited in its effectiveness for reproducing a realistic fading environment. Thus, the conventional methods of simulating a fading environment for testing in the factory are therefore insufficient to ensure optimum operation of wireless communication devices in the field. This leads to inefficient device/system performance, especially in heavy handoff areas where fading is present.

SUMMARY OF THE INVENTION

In order to overcome the problems associated with conventional methods for simulating a communication link in the factory, the systems and methods described herein provide for simulation methods that rely on dynamic fading information obtained in actual wireless communication system environment. This is in contrast with the static and empirical information used in conventional methods. The systems and methods described herein employ deterministic processes for data abstraction; this is to the exclusion of statistical assumptions and the First Principle techniques, which are subject to the limitations described above.

To this end, the systems and methods described herein abstract channel information from field data gathered in actual communication system environments with no need to use any RF signal sources for measurement. This passive approach actually avoids the disadvantages associated with today's radio channel sounding systems, making it a highly versatile method to abstract field data and to simulate a complex wireless communication system. The abstracted data is transformed into control signals or programming codes that can be used to control a channel simulator so as to accurately recreate the field conditions, including path loss, slow fading, fast fading with LOS & non-LOS, multipath delay, fading PSD with and without LOS peak, and other multipath effects. The recreated conditions also offer a fading handoff environment, including the soft handoff and hard handoff. As a result, wireless communication devices can be accurately tested to ensure that they will maintain optimum performance even when experiencing difficult signal conditions.

To reduce the test time and overhead, in one aspect of the invention the field data is analyzed and only those portions that exhibit receiver challenging propagation conditions are used to generate control signals for the channel simulators. Receiver challenging propagation conditions include fading (generally, severe fading), hard handoff conditions, soft hand off conditions, softer hand off conditions, inter-band hand off conditions, intra-band hand off conditions and delay spreading. Other similar conditions will be apparent to those of skill in the art. In factories where tens of thousands of devices are being manufactured a day, the time saved due to this aspect can translate in to large cost savings for the manufacturer.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which:

FIG. 9 is the diagram illustrating the definition and calculation of the angle between a retriever's moving direction and a line connected the retriever and a communication sector (i).

DETAILED DESCRIPTION OF THE PREFERRED EMBODIMENTS

Figure 1:
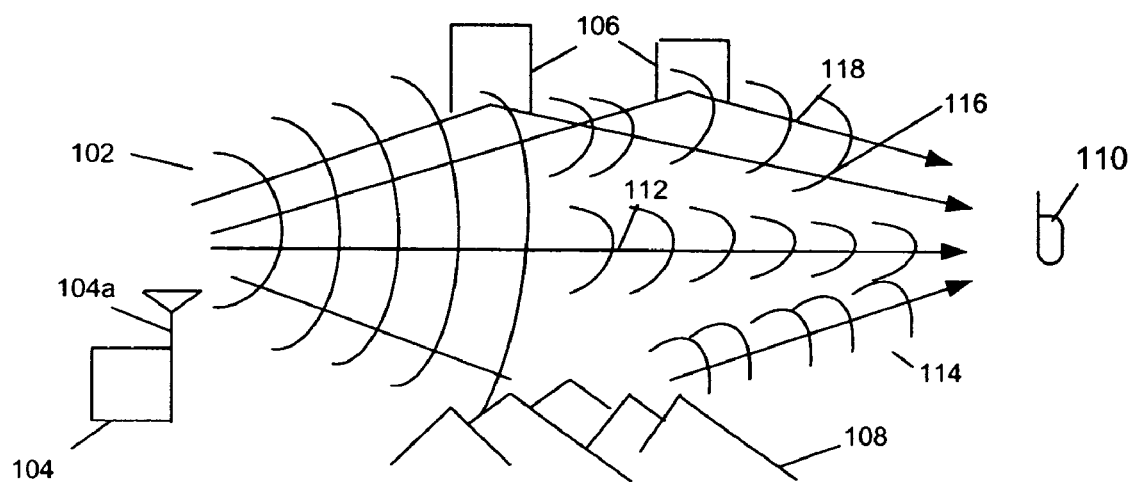
FIG. 1 is a diagram illustrating the multiple propagation of RF signals in a wireless communication system.
Figure 2A:
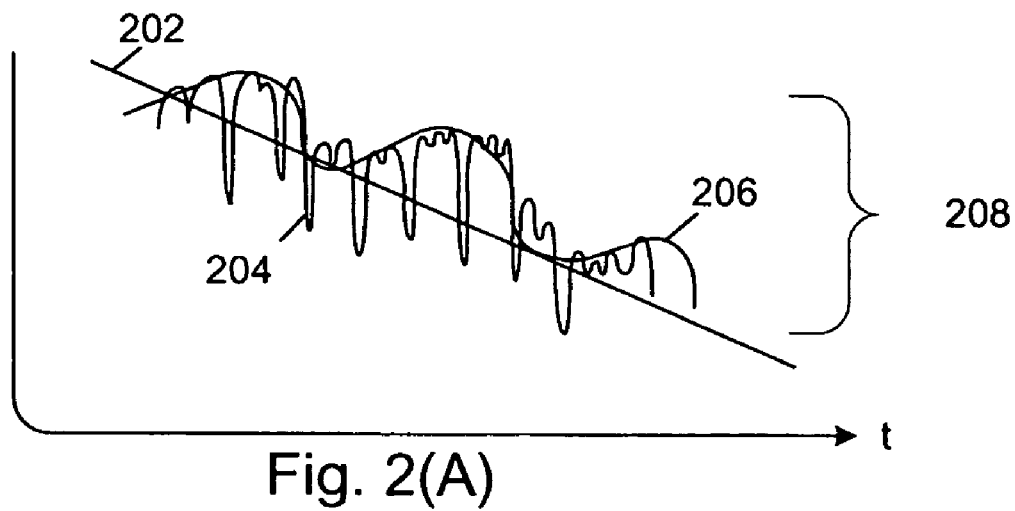
FIG. 2 is a diagram illustrating fading components that effect an RF signal propagating within a wireless communication system with one RF source, such as the system of FIG. 1.
Figure 2B:
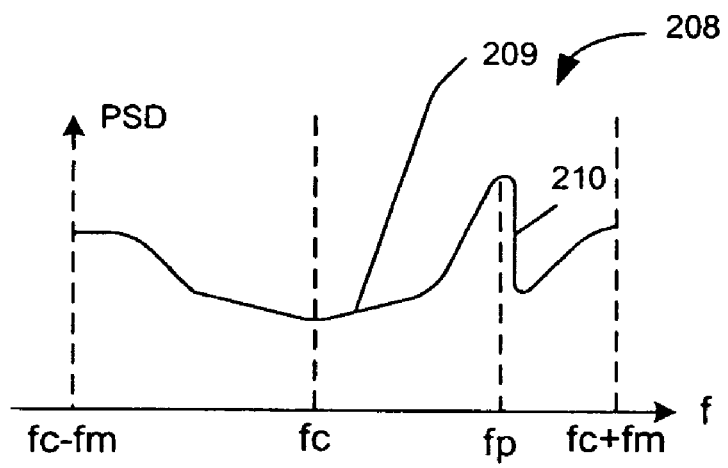
Figure 3:
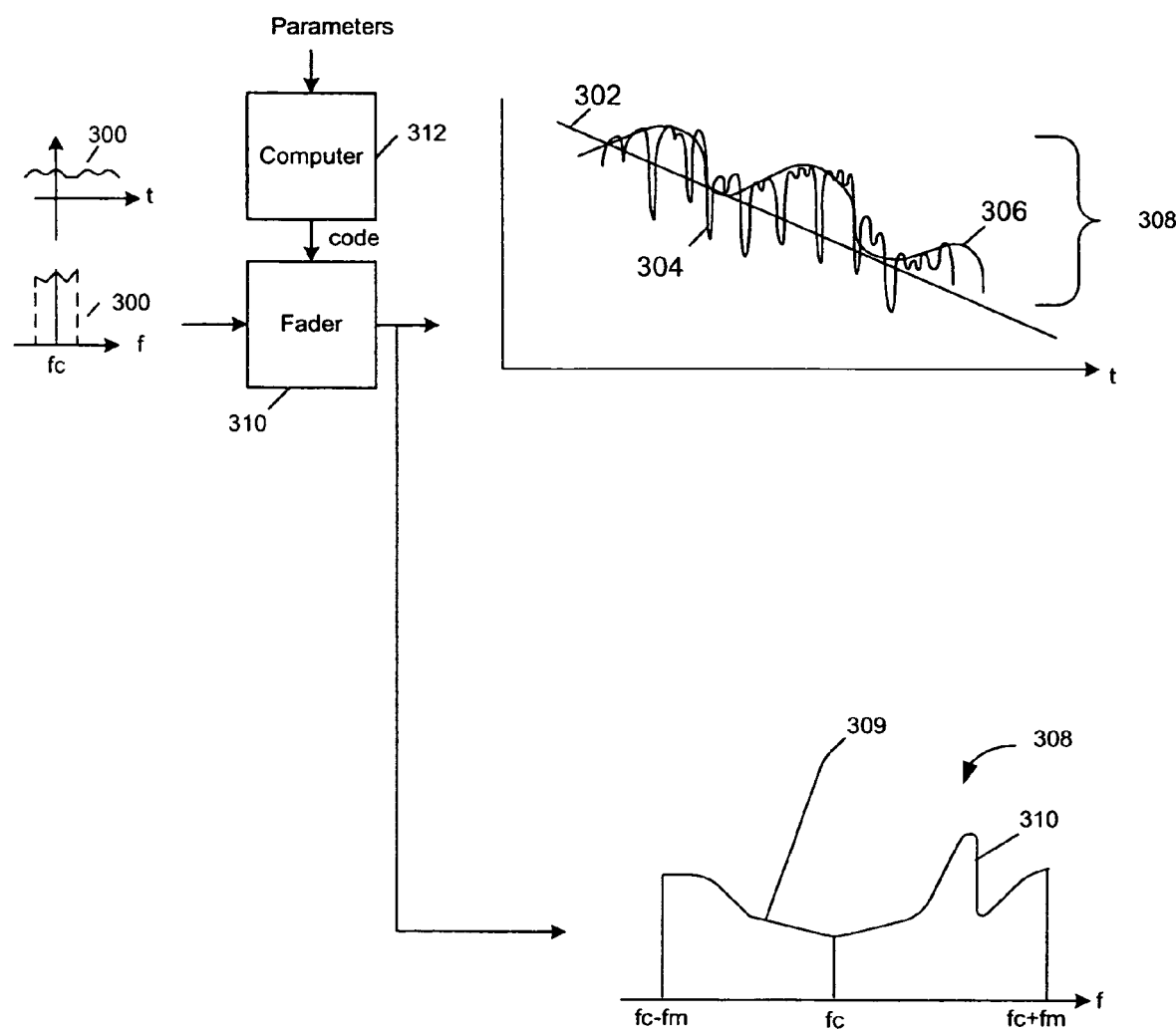
FIG. 3 is a diagram illustrating an exemplary method for generating a test signal for testing a wireless communication device before it is employed in the system of FIG. 1.
Figure 4:
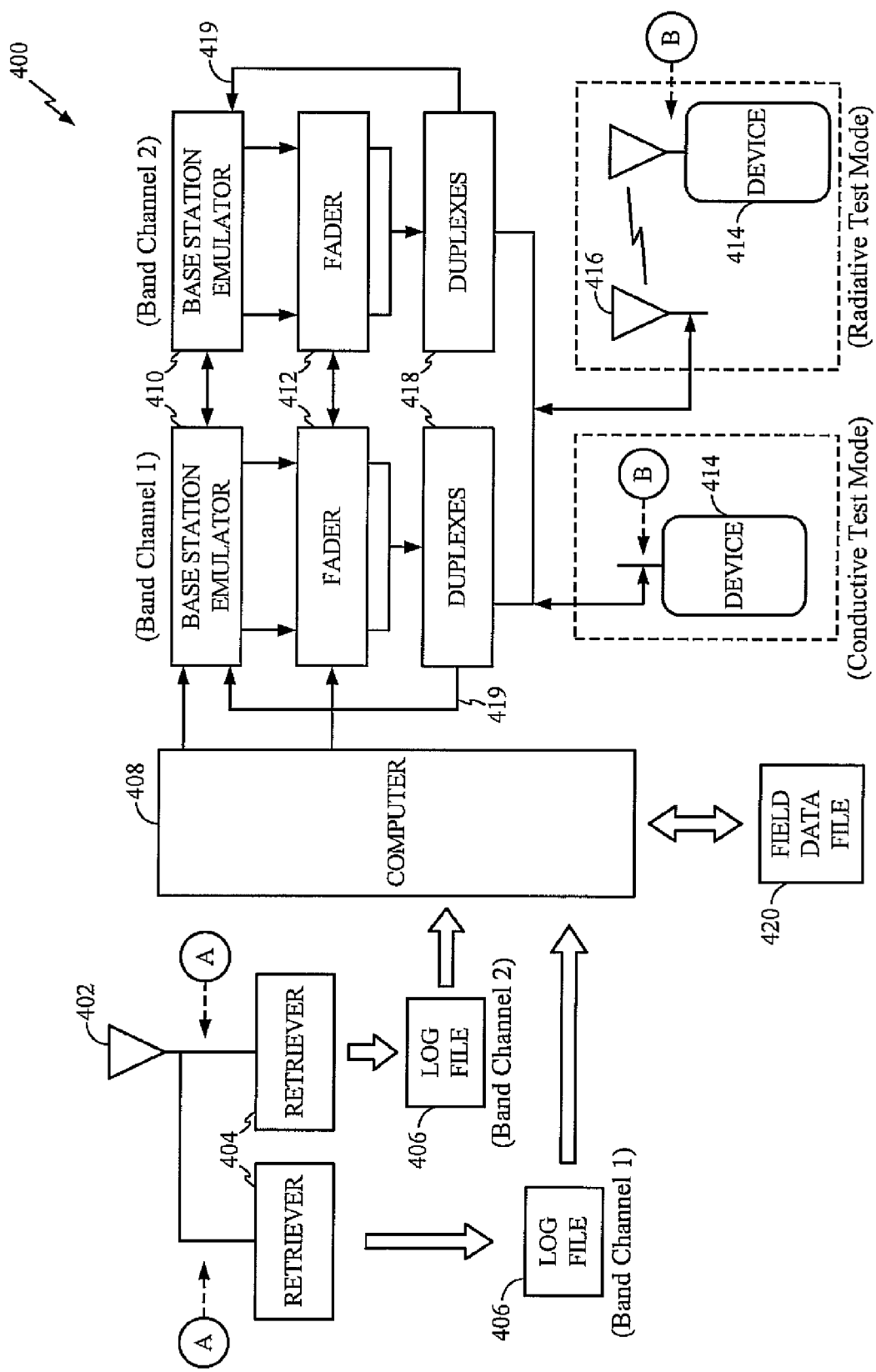
FIG. 4 is a logical block diagram illustrating one example embodiment of a system configured to simulate a wireless communication link in accordance with the invention.

FIG. 4 is a diagram illustrating a system 400 that can be used in accordance with the systems and methods described herein to simulate a wireless communication link of one or more band channels in order to test the performance of a wireless communication device, such as device 414. Note that the center frequency and bandwidth of the band channel used in the systems and methods described herein is are wireless system dependent. In an IS-95 and IS2000 compliant communication system, for example, the band channel is CDMA channel with 1.25 MHz of bandwidth and center frequency covering from cellular to PCS band. Although system 400 in FIG. 4 has only 2 band channels, i.e., Band Channel 1 and Band Channel 2, the systems and methods described herein could contain any number of the band channel. Thus, for example, a system 400 can be used to simulate a CDMA wireless communication link containing 2 cellular CDMA channels and 1 PCS CDMA channel. In FIG. 4, and the rest of the discussion that follows, it is assumed that device 414 is a wireless communication handset; however, it will be clear that device 414 can be any type of device equipped with a radio for wireless communication within a wireless communication system. Device 414 can also be a virtual device in a software package for wireless communication system design, for example, where a fading RF signal is used as input to the virtual device for verifying the system performance at the design stage. In this circumstance, the fading RF signals created by the systems and methods described herein should be in the form of the computer codes directly output from computer 408 instead of from duplex 418 to the virtual device in the system design package. Furthermore, the source RF signals originally output from the base station emulators 410 in system 400 should also be in the form of the computer codes embedded in the computer 408, which may or may not contain messages and signaling. The format of the computer codes of both the fading RF signals and the source RF signals in computer 408, as well as the decision of whether the codes contain the messages and signaling or not should be decided by the simulation design of the system design package.

System 400 includes an omnidirectional antenna 402 interfaced with a number of retriever 404. Each retriever 404 provides a log file 406. Antenna 402 and retrievers 404 are used for data logging in an actual in-door or outdoor, wireless communication system. For example, field engineers can drive along a predesigned path, such as a particular highway route or a particular route through downtown city streets, for a predetermined time period or distance. While traversing the path, the field engineers use antenna 402 and retrievers 404 to record data associated with forward link signals in one or more band channels within the wireless communication system. Antenna 402 should have an omnidirectional pattern on the horizon and work properly in the band to cover the whole spectrum of assigned band channels.

All forward link signals for data logging in accordance with the systems and methods described herein should contain the least interference from the sources other than base stations/sectors in the system in order to prevent interference in band sources from jamming the log data.

All retrievers 404 in system 400 should be synchronized together. The time marks in log files 406 are synchronized to each other. The retrievers 404, which are assigned to work on a particular band channel, should have the same receiving performance, such as receiver sensitivity, dynamic range, etc. The mount of retrievers 404 to antenna 402 should be symmetric around the vertical axis of antenna 402, so that the influence of retrievers 404 on antenna 402's omnidirectional directivity pattern is reduced to its minimum. This achieves an equal weight with respect to azimuth angle of the integration of the incident EM field on antenna 402. This property is embedded in the resulting field RF signals represented at point A.

For a complicated RF propagation field and synchronous data logging more than one retriever 404 per band channel in parallel connection to an antenna 402 should be used. The actual number of retrievers 404 used for a band channel should be equal to or larger than the maximum channel number simultaneously received in any moment in that band channel along a particular communication path. In this situation, each retriever 404 could be assigned to record the RF information for one or pre-assigned number of channels for a period of time, depending on each retriever's search and reporting structure design. One or more RF amplifiers in that band channel could be used between antenna 402 and retrievers 404 (not shown in FIG. 4).

A goal of system 400 is to collect enough information about the RF environment as seen by antennas 402 and presented at point A to allow the environment to be recreated in the factory, or lab, at point B, which is the test interface with device 414. Preferably, the lab has a conductive test mode, in which point B is the link point between the output of duplexes 418 and the input of device 414's RF front end. In the description that follows, it is assumed that device 414 is in conductive test mode, so the recreated environment at point B as well as at the output of duplexes 418 is the same. This assumption, however, does not limit the systems and methods described herein as device 414 can be configured to work in a radiative test mode as well.

In the radiative test mode, the simulated signal output from duplexes must be radiated over the air by antenna 416 and received by the antenna of device 414. The output of antenna 416 preferably propagates through free space with no multiple path interference, e.g., in an antenna anechoic chamber under far-field conditions. In radiative test mode, point B is still at the junction between the receiving antenna and RF front end of device 414. In order to make point B a replica of point A in radiative test mode, calibration values, such as the loss of duplex 418, the gain of antenna 416, the antenna gain for device 414, the loss of the connectors between these devices, and the free space attenuation for each band channel should be taken into consideration.

To recreate the RF environment at point A, each band channel's data logged by antenna 402 and the assigned retrievers 404 is stored in all log files 406, each of which is associated with a retriever 404, in accordance with the retriever manufacturers' predefined format. Thus, for example, if three band channels are simultaneously logged and each band channel adopts 6 of retriever 404, then 3×6=18 log files 406 should be separately created. In addition, as will be explained more fully below, retrievers 404 can be configured to retrieve data synchronously or asynchronously. Software configured in accordance with the systems and methods described herein, and running for example on computer 408, is then used to abstract forward link parameters associated with the forward link channel properties in each band channel received at point A from log files 406. These parameters can then be stored in field data file 420, for example, on computer 408.

The forward link parameters stored in field data file 420 preferably include the total RF power (Rx), as well as the ratios of energy per chip to total power spectral density (Ec/Io) for each pilot signal, or base station transmitter's beacon signal, received by antenna 402 and retrievers 404 for each band channel. The pilot signal, or the base station transmitter's beacon signal in 3GPPWCDMA, for example, is the Synchronization Channel (SCH) signal. All stored parameters must also be associated with their time marks (t) recorded and stored in field data files 420. Preferably, each pilot signal (Ec/Io) can also be further resolved into its multipath components. In which case, the forward link parameters will also include a time varying multipath delay time ($\tau$) associated with each multipath components in each pilot signal. Finally, it is preferable to include retrievers 404 velocity (u) and their GPS information of longitude (x), latitude (y), and altitude (z) for each time mark (t), as well as each sector's GPS information of longitude (X), latitude (Y), and altitude (Z) in field data files 420. Note that each sector's GPS information is not abstracted from the log files 406 but provided by the service providers and independents on time. Also, the gain of antenna 402 in each band channel should be stored in the field data file 420 as a part of the forward link parameters.

Software configured in accordance with the systems and methods described herein, running for example on computer 408, uses the forward link parameters stored in field data files 420 together with calibration values obtained from base station emulators 410, faders 412, duplexes 418, and their connections for conductive test mode to generate computer control codes that can be used to recreate the RF environment as seen at point A. In the radiative test mode, the calibration values are obtained from base station emulators 410, faders 412, duplexes 418, transmission antennas 416, antenna anechoic chamber, device antenna 414, and their connections. Exemplary mathematical principles underlying the generation process are described in detail below. In general, however, the software takes the data stored in field data files 420, determines if it is synchronous or asynchronous, and then generates computer control codes that comprise the required content and format to control channel simulators, or faders, 412 and emulators 410.

To generate the computer control codes, it is assumed, for example, that for any given time (t), the total received power (Rx) for each band channel is a superimposed scalar. This assumption allows the software to decompose (Rx) for each band channel into power components that correspond with each channel received at point A in that band channel. Further, if field data files 420 include multipath information, then power ingredients for multipaths of each channel and each band channel can also be obtained. This process is illustrated for two received channels in a band channel by the graphs in FIG. 5.

Thus, for example, curve 502 illustrates a graph of the total received power (Rx) versus time in a band channel. The total receive power (Rx) is then decomposed into data representing the received power for channel 1 and channel 2 in that band channel as illustrated by curves 504 and 506 respectively. If multipath pilot (Ec/Io) and multipath delay time information ($\tau$) are stored for each channel, then curves 504 and 506 can be further decomposed into multipath power curves 514 and 524, and 516 and 526, respectively. Each of the multiple path curves are also associated with a delay ($\tau$) for all paths in both channel 1 and channel 2. Further, the Doppler frequency ($f_m$) and angles between Retriever 404 and the sectors (not shown) for each channel in that band channel versus time (t) are preferably included in the computer control codes. The Doppler frequency ($f_m$) and the angles are determined based on the wireless communication system carries frequency ($f_c$) in that band channel, retriever 404 velocity (u), and GPS information of longitude (x, X), latitude (y, Y), and altitude (z, Z) for retriever 404 and the sectors respectively, which are stored in field data files 420.

Figure 5:
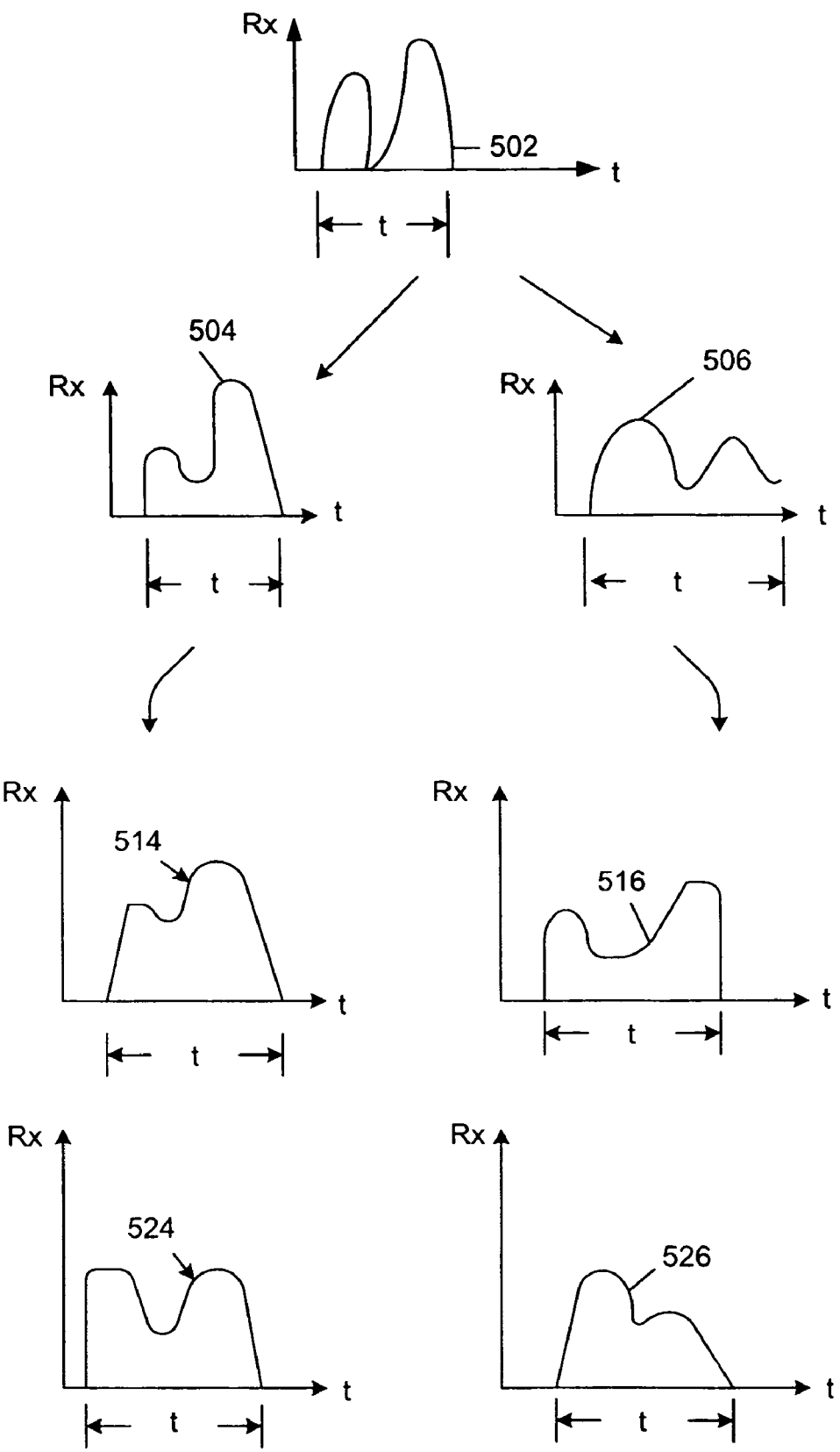
FIG. 5 is a diagram illustrating the total received RF power and decomposed channel powers obtained using the system of FIG. 4.

The decomposed power components for each channel, e.g., channel 1 and channel 2 in a band channel in FIG. 5, and for each multiple path are then abstracted for each time (t) for synchronous data, or each time period (T) for asynchronous data. The partitioned power components, the multipath delay data, the Doppler frequency ($f_m$), and the angle data together with the calibration values in that band channel obtained from base station emulators 410, faders 412, duplex 418, and their connections in conductive test mode are then used to generate the computer control codes, which in turn are used to program faders 412 and emulators 410. In the radiative test mode, the calibration values are obtained from base station emulators 410, faders 412, duplex 418, antenna 416, antenna anechoic chamber, device antenna 414, and their connections for each band channel.

Faders 412 are interfaced with base station emulators 410. A base station emulator 410 can provide a predetermined number of RF forward link channels, each of which should be connected to a modulation channel in fader 412. In system 400, a band channel usually requires a number of emulator 410 and fader 412, and a duplex 418 to provide a predetermined number of RF forward link channels. The required number of emulator 410 and fader 412 for a band channel depends on the structure and design of the emulator 410 and fader 412 used in system 400. The number of channels provided by a set of emulators 410, faders 412, duplex 418 for any particular band channel is determined so that it is equal to the maximum number of channels that can possibly be received simultaneously in each moment at point A in that particular band channel. Thus, for each channel in a band channel, there will be one emulated base station signal generated for that channel provided by a base station emulator 410 and modulated by a modulation channel in fader 412. For example, after reviewing multiple field data files, it has been found that typically the maximum number of measurable, significant channels simultaneously received at point A in one of any CDMA channels rarely exceeds 6 for the path through city streets. Therefore, base station emulators 410 can typically be configured for a maximum of 6 channels for a band channel in CDMA system simulation. Faders 412 are then configured to form 6 modulation channels in that set, each of which modulates a channel from base station emulators 410 using the computer control codes so as to recreate at point B the RF environment, or communication link, measured at point A for that band channel. For each band channel, all output signals from faders 412 are combined together to a duplex 418. Thus output signal from a duplex 418 is a synthesized and simulated forward communication link for that band channel, which can be directly transferred to device 414 in conductive test mode and to antenna 416 for device 414 in radiative test mode. For each band channel, the duplex 418 should also provide a reverse link channel 419 to the emulators 410 in that band channel. The reverse link RF signal in each reverse link channel 419 comes from device 414 in conductive test mode and the antenna 416 for device 414 in radiative test mode. Thus, for example, the system 400 in FIG. 4 contains two sets of emulators 410, faders 412, and duplex 418. Each set provides a predetermined number of RF forward link channels in Band Channel 1 and Band Channel 2 respectively. The output signals from two duplexes 418 are combined together; therefore the synthesized and simulated forward communication link output from duplexes 418 contains two band channels information, which is fed to device 414 in conductive test mode and antenna 416 for device 414 in radiative test mode. Also, each duplex 418 provides a reverse link channel 410 separately to each band channel's emulators 410.

The systems and methods described above have no limitation on how many band channels could be included in system 400. Therefore system 400 could be used to recreate the communication link at point B including a wide range of band channels. In IS-95 or IS-2000 compliant system, for example, some communication links could contain a number of band channels, or CDMA channels, within Band Class 0 (cellular) and/or Band Class 1 (PCS), which can be recreated by the systems and methods described herein. Thus device 414 could experience many kind of hand off, such as soft, softer, intra-band hard, and inter-band hard handoffs in the simulated fading environment recreated by the system 400.

Figure 6:
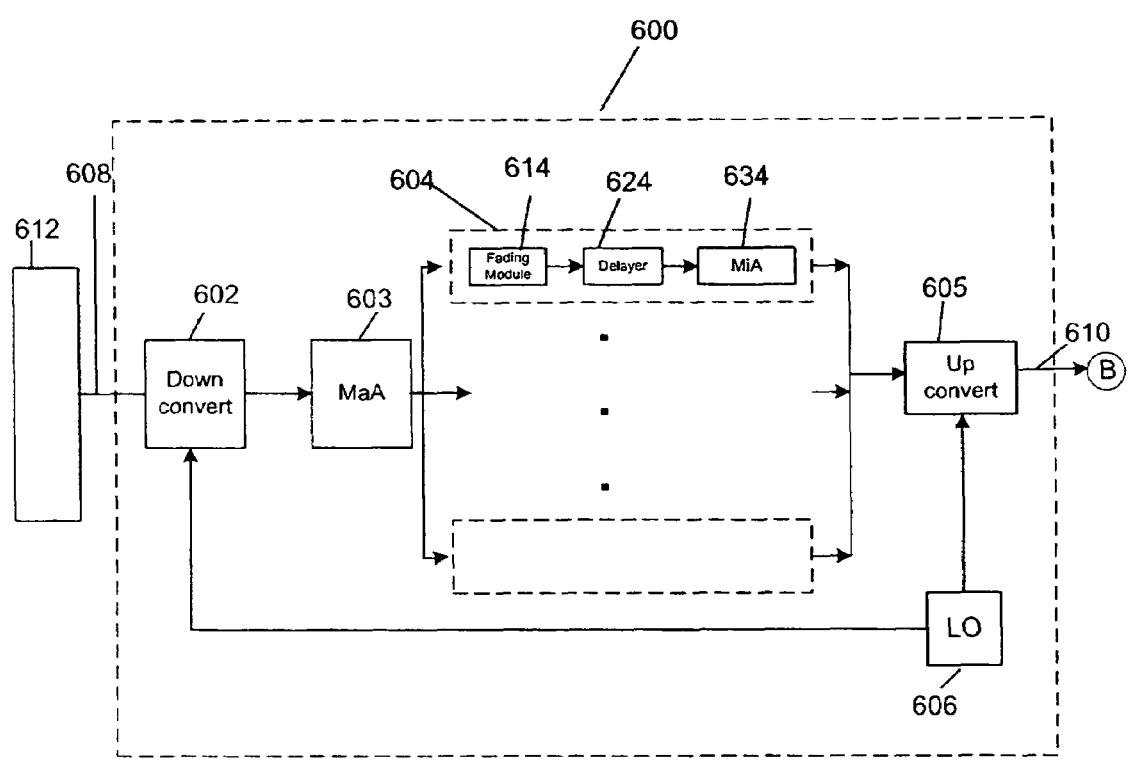
FIG. 6 is a logical block diagram illustrating one example embodiment of a controllable channel in channel simulator, or fader, that can be used in the system of FIG. 4 in accordance with the invention.

The components that comprise one example embodiment of modulation channel 600 in a typically commercial fader are illustrated in FIG. 6. Modulation channel 600 can include down converter 602, and up converter 605 to transfer the input RF channel signal into baseband and vice versa through local oscillator (LO) 606. Modulation channel 600 comprises a main channel 608 which is attenuated by major attenuator 603. The output of major attenuator 603 is then connected to a number of multipaths.

A typical multipath 604 consists of a fading module 614, a delayer 624, and a minor attenuator 634. Modulation channel 600 receives a channel signal into main channel 608 from base station emulator 612, which as explained before corresponds to one of the channels transmitted to air and received at point A in one band channel. The signal on main channel 608 is then down converted to baseband and run through major attenuator 603 (MaA), which attenuates the signal so that its power varies in accordance with the variations seen in the corresponding channel received at point A. The attenuated signal is then passed through multipaths, such as path 604, where fading module 614, delayer 624, and minor attenuator 634 (MiA) are configured by the computer control codes generated from the field data file so as to replicate the multipaths recorded for that particular channel. The resulting multipaths can then be combined together for up converting into an output signal 610.

The same process is applied to each channel generated by base station emulators 612. The outputs for each channel, e.g., output 610, in one band channel can then be combined to feed to duplex and to recreate the RF environment as seen at point A. The result, referring back to FIG. 4, is that the RF environment generated at point B will be a very close approximation of the environment seen at point A.

Significantly, it should be noted that base station emulator 410 in FIG. 4 is not limited to generating communication channels in accordance with any specific communication standard. In other words, the systems and methods described above can be implemented regardless of the RF carrier type, the frequency being used, and the messages/signaling/data present in the wireless communication system. Moreover, the systems and methods described can also easily be implemented for future communication systems, including wide band systems, as well as for systems operating in new frequency bands.

The computer control codes generated from field data files 420 are preferably formatted and include the data necessary to configure faders 412 and emulators 410 directly. Alternatively, the computer control codes can be stored on a computer readable medium and then loaded into a given system and used to configure a fader and a emulator, such as fader 412 and emulator 410, when required. Similarly, the software used to process field data files 420 and to generate the computer control codes can also be transported on a computer readable medium to a particular simulation system and loaded onto that system. Once loaded, field data files 420, abstracted from log files 406, can be fed into the system, computer control codes generated therefrom, and the computer control codes used to program the system in order to recreate a RF environment as described above.

As used herein, the term "computer readable medium" refers to any media used to provide one or more sequences of one or more instructions to a processing system for execution. Non-limiting examples of these media include removable storage units, such as floppy disks, writeable CD-ROMs, etc. The term computer readable medium also refers to storage devices such as a hard disk installed in hard disk drive, or memory such as a ROM installed in the computer system. These computer readable media are means for providing programming instructions to a computer system.

The transportability of the software and the computer control codes expands the ways in which the systems and method described herein can be deployed. For example, computer control code files can be integrated into fader 412 and emulator 410 as a value added product. Similarly, computer control code files can be integrated into software design packages for wireless communication systems or devices. In fact, many software design packages include signal generator functions for generating test signals. These generator functions typically include classic signal models such as AWGN, Rayleigh, and Rician fading. But as noted above, classic models are limited in their ability to recreate realistic RF environments. Therefore, integrating the ability of the systems and methods described herein can result in much more accurate simulations and, therefore, better system designs.

Further, the entire software code can be integrated into a complete wireless communication system emulator in order to accurately recreate/simulate the system environment. This would for example, be advantageous for radiobiological and biomedical studies of the effects of RF signals in a wireless communication system and for carriers who need to be able to accurately simulate the operation of their networks.

It should be noted that there will be variations in the channel output powers due to tolerance differences between base station emulators 410, and even between channels within a base station emulator 410. Such variations are also typically frequency dependent. Similarly, these types of variations will also be present in the various components that comprise base station emulator 410, fader 412, duplex 418 and the cables connected to device 414 in a conductive test mode. In addition, there are also variations in the antenna 416, the antenna gain of device 414, as well as in the air chamber's free space loss in radiative test mode. Accordingly, calibration data is preferably pre-measured and included in the computer control codes for each forward channel in faders 412 and emulators 410. The software used to generate the computer control codes is then preferably configured in such a way that it can combine the parameters in the field data files together with the calibration data to further ensure an accurately simulated RF environment.

Accordingly, accurate and reliable testing can be performed in the lab to simulate a variety of field environments due to the advantages associated with the systems and methods described herein. Other specific advantages that flow from the systems and methods described include large cost savings in the establishment of a simulation lab for testing wireless communication devices. This is because complex and time consuming field testing can be avoided. Further, uncertainties, static, and empirical errors that are associated with the hypothesis imbedded in conventional simulation methods are avoided, because the actual RF environment is simply recreated in an accurate, objective fashion. Thus, the results obtained from testing wireless devices are more reliable, which should lead to better performance within the actual wireless communication system.

Not only is the testing more reliable, however, it is also more repeatable due to the objective recreation of the actual RF environment, which can be repetitively played back a potentially unlimited number of times.

In another embodiment, the advantages of the systems and methods described herein are further enhanced by reducing the test time required for each wireless communication device, while still achieving the same accuracy in the test results. This can be accomplished because only certain portion of field data files 420 will exhibit receiver challenging propagation conditions. But it is actually these portions of field data files 420 that are of most interest when testing devices. Therefore, field data files 420 can be condensed so as to only include those portions that exhibit receiver challenging propagation conditions without impacting the reliability of the test results.

In general, the parameters and phenomena selected in field data files 420 for condensing and controlling shall not be limited only to selecting the receiver challenging propagation conditions into the scenarios. Depending on the applications, any abstracted propagation parameters and phenomena can be selected and modified within any predetermined time period or path for quantitatively tuning and controlling. The candidate parameters and phenomena could include, but not limited, the path loss, multipath power and delay, slow fading, fast fading, fading PSD, Doppler frequency, LOS Doppler frequency, soft/softer/hard handoff, and even the additionally external interference, and their time-dependence functions. The standard of selecting and controlling the parameters and phenomena and their time-dependence could be based on, for example, the judgment of the testing results between the propagation parameters/phenomena and the objectives of the studies. In radiobiological and biomedical studies, for example, the parameters and phenomena selected for tune and control could be based on the preliminary quantitative results between the study objectives and the propagation parameters and phenomena.

Recreation of a controllable and condensed RF fading environment is highly useful. First of all, it is indeed a replica of realistic wireless communication link with complete fidelity, which provides the reality and objectivity toward the study. On the other hands, through selecting some predetermined parameters and propagation phenomena for tuning and controlling, the test process is accelerated, or the time required to reaching the designed goal of the study become short. And all procedures are under quantitatively control in terms of abstracted powers, time, frequency, speed of receiver, number of channels and multiple path, etc.

Thus, in a first example implementation, software running, for example, on computer 408, can be configured to determine from field data files 420 which channels in which band channels are important and for what time periods. Based on this determination, the selected portions in field data files 420 can be re-stored, for example, as select files 422. Select files 422 can then be pieced together and the interfaces smoothed out for continuity, thus forming a condensed field data file. The computer control codes can then be generated from the pieced together select files 422. As a result, the required test time can be greatly reduced, which saves costs and increases output in the factory. Both of which are extremely beneficial. The condensing of field data files 420 to select files 422 can be performed automatically by the software or it can be performed manually using a specially designed graphical user interface, for example, displayed on computer 408 and controlled by a program with adequate mathematical and statistical capabilities.

In a second example implementation, software running, for example, on computer 408, can be further configured to determine which parameter in the abstracted information based on the select files 422 should be tuned and controlled, and what the range of tuning and controlling for that parameter will be. Thus, the parameters after the tuning can be re-stored together with the rest of parameters, and the computer control code for faders can be generated based on these re-stored parameters. In this example, the selecting and tuning parameters can be performed automatically by the software or it can be performed manually using a specially designed graphical user interface, for example, displayed on computer 408 and controlled by a program with adequate mathematical and statistical capabilities.

In another embodiment, the fast fading information can actually be played back by three approaches at simulation stage. The first approach is to directly play back the fast fading, together with other fading information, without any modification. The fast fading information having been abstracted from the field data files together with all other fading information. In this approach, the retriever's velocity (u) and its GPS location information (x, y, z) as well as each sector's GPS location information (X, Y, Z) has no use at all. Thus, retriever 404 can omit these parameters during field logging to save cost and time. This approach is ideal for a flat PSD fading situation, e.g., for simulating the fading propagation in an in-door wireless system. It is also suitable for simulating an outdoor wireless system fading environment, where, the PSD fading, e.g., classic 6 dB fading power spectrum and LOS peak due to the Doppler frequency shift, is not an important issue. On the other hand, this approach should require the sampling rate of retriever 404 is high enough to catch up the fast fading contours of power signals in field. And the state changing rate of faders 412 in its dynamic mode should be equal to the sampling rate of retriever 404 in order to recreate the fast fading contours of power signals without loss of fidelity, which has been embedded in the computer control codes created by the systems and methods described herein.

If the 6 dB fading power spectrum due to the Doppler shift is an important issue, but its LOS peak is not, then a second approach can be adopted. In this approach, the retriever's velocity (u) must be added to field data files 420. Thus the computer control codes generated for fader 412 will include the Doppler frequency ($f_m$) for each time mark (t) used for the fading PSD.

In a third approach, when 6 dB fading power spectrum and LOS peak are both important issues, then the retriever's velocity (u) and its GPS location information (x, y, z) as well as each sector's GPS location information (X, Y, Z) has to be included in field data files 420. This means the computer control codes generated for faders 412 and emulators 410 will contain information related to the fading PSD as well as the LOS peak. In the second and third approaches, due to the limitation of conventional commercial faders, the fast fading signals can be removed from field data files 420, before the computer control codes are generated. The parameters in existing statistical math models for Rayleigh or Rician fading can then be used to generate fast fading scenarios that can be fed back into the computer control codes used to configure fader 412. While the faithful replication of the RF environment at point A is somewhat compromised, such an approach does provide greater flexibility and variation in the test scenarios.

Now that the general process and the advantages obtained therefrom have been described, some exemplary mathematical principles will be explained that allow the systems and methods described herein to achieve the advantages described. In other words, the advantages described herein can be obtained by applying the following principles in the manner described below.

First, it must be remembered that data recorded in log files 406 can be synchronous or asynchronous. In both situations, the information recorded in log files 406 and abstracted and stored to field data file 420 includes the total received power (Rx), typically measured in decibels above one milliwatt (dBm), for each band channel. Preferably, Rx is actually measured at A, i.e., after antenna 402 at the input to the associated retriever's RF front end. This provides several advantages. First, many receivers, including commercially available field retrievers and mobile phones, use this definition for their reported Rx. Rx recorded in log files 406 for these receivers can then be directly used for calculation in accordance with the systems and methods described herein with no need for further compensation for the gain of antenna 402, provided that antenna 402 has a same gain as that of device 414. Thus, if a complete replica of the radio environment at point A is achieved in point B by the systems and methods described herein, then device 414 under conductive and radiative test modes will truly experience the same radio environment as in the field. That is because point A and B both are defined at the location after the antenna and before the RF front end. Secondly, if an omnidirectional antenna 402 is used in system 400 in accordance with the systems and methods described herein, antenna 402's gain information recorded in field data file 420 for each band channel should be used together with device 414's antenna gains to calculate the compensation of the recorded relative RF power level for each band channel at point A. This compensation can make the simulated radio environment at point B, which is the replica of the recorded communication link at point A, as if received by device 414 itself in field using its own antenna.

Field data file 420 also includes pilot Ec/Io in decibels (dB) for each channel and for each multipath received in each band channel. Field data file 420 also preferably includes the multipath delay time ($\tau$) for each multipath in each band channel. The retriever velocity (u), its GPS information of longitude (x), latitude (y), altitude (z), and each sector's GPS information (X, Y, Z) can be added into field data files 420, although each sector's GPS information (X, Y, Z) is in general not assigned to retriever 404 and time independent parameters. The above values, except each sector's GPS information, are sampled periodically or not periodically, depending on the structure and design of the retriever 404 used in system 400.

In periodical sampling case, the sampling period (T) can be designated ($\delta$) measured in milliseconds (ms). Thus, the information stored to field data file 420 can comprise measurements of the above values taken every $\delta$(ms) for each band channel. One set of measurements can be termed a data set. Thus, for the synchronous measurement situation, where the number of channels retrieved is N in a band channel and the number of parameters per channel is K, one data set comprises NK values for that band channel.

The asynchronous situation is slightly more complex. In this situation, suppose there are still N channels in a band channel; however, one channel is "active" and a sampling period is used that is equal to N$\delta$. At the beginning of the sampling period, the active channel, assume channel 1, is sampled over $\delta$(ms). The other channels are then randomly reported during the sampling period. At the end of this sampling period, N channels are sampled. At the beginning of the next sampling period, the active channel, which is still channel 1 in our example, is sampled again and so on. Thus, there will be NK values in the data set for that band channel, but the sample period (T) is equal to N$\delta$(ms), as opposed to obtaining one data set per every $\delta$(ms) in synchronous measurement situation.

Figure 7:
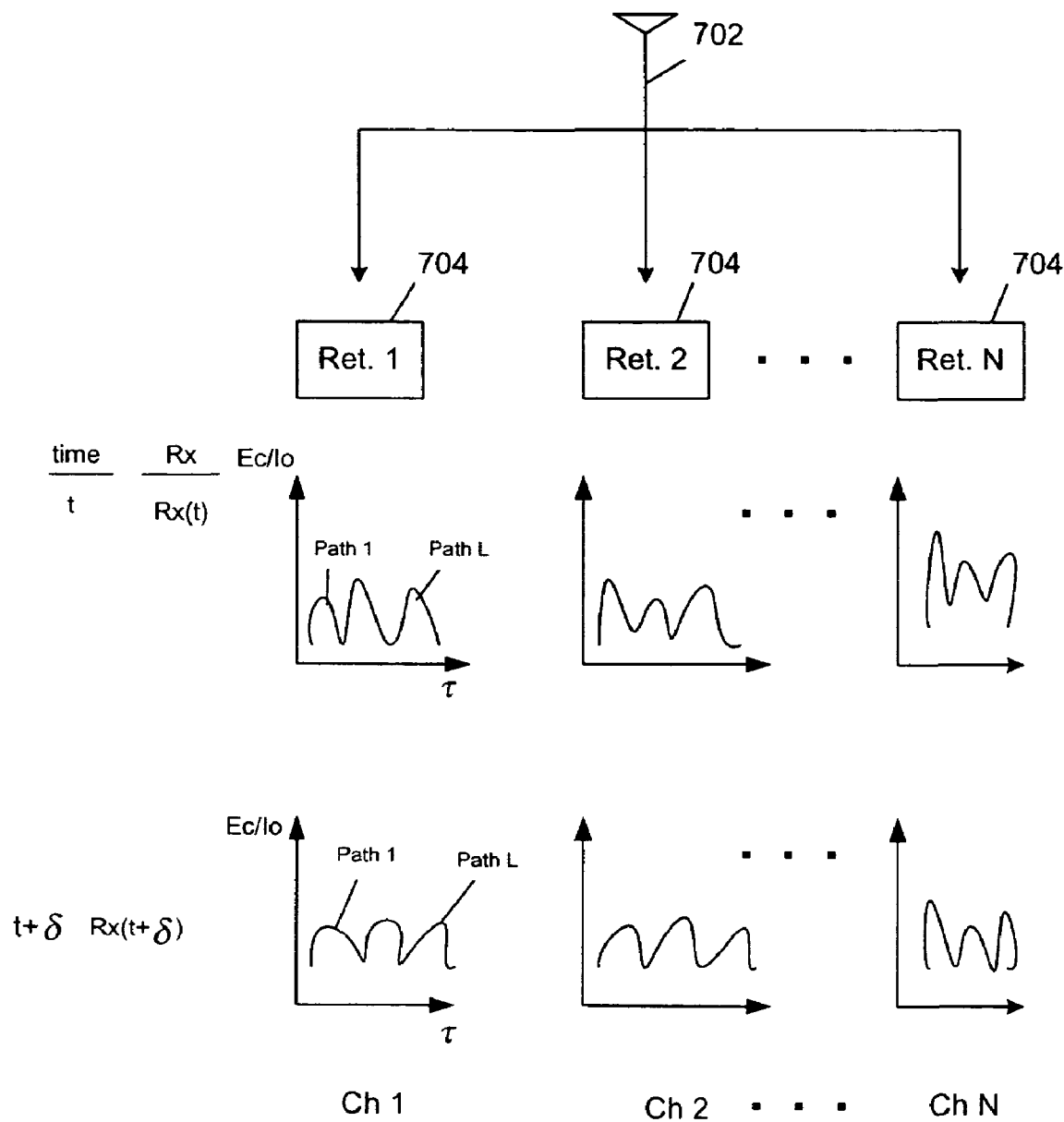
FIG. 7 is a diagram illustrating synchronous sampling of an RF environment using the system of FIG. 4 in accordance with one embodiment of the invention.
Figure 8:
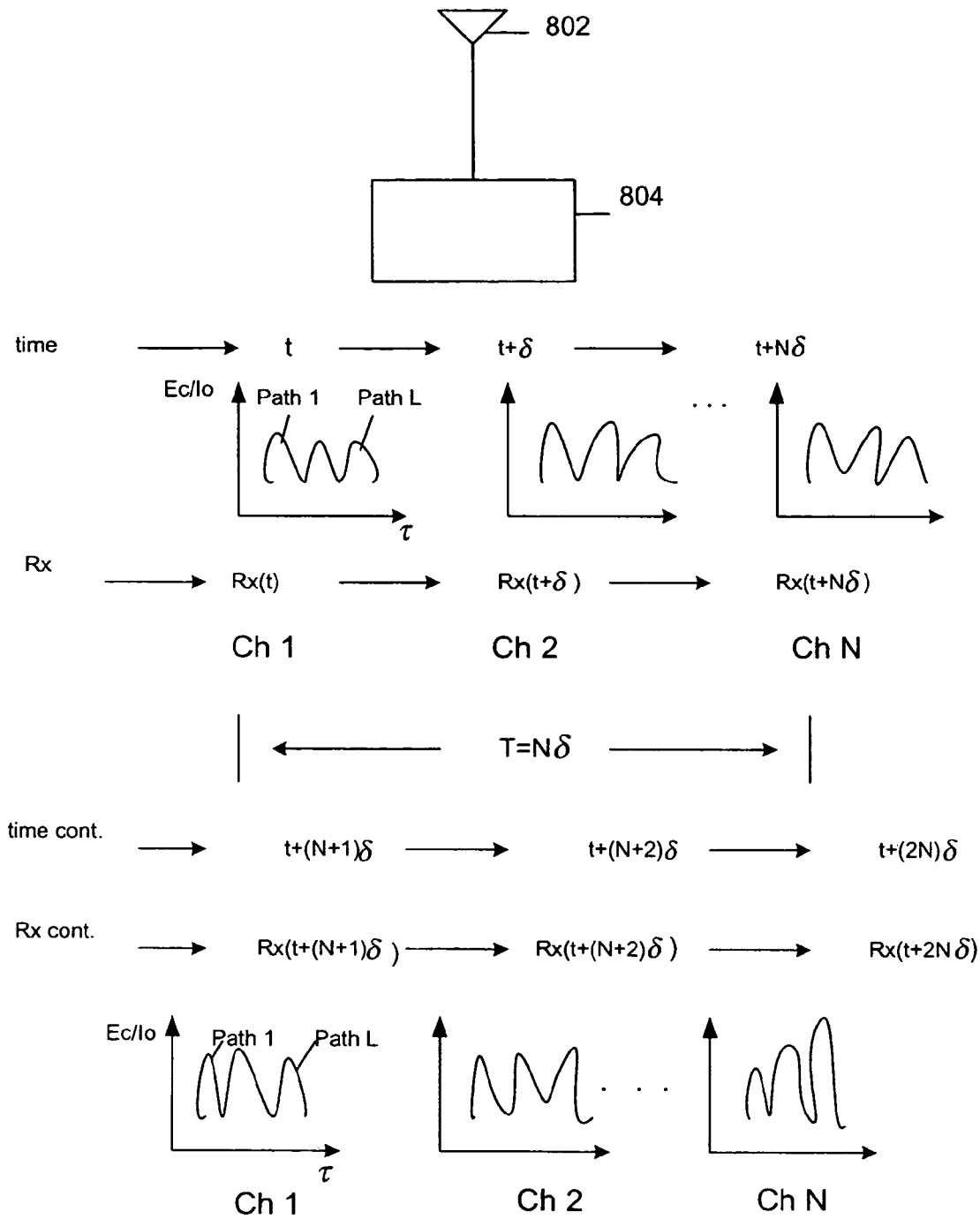
FIG. 8 is a diagram illustrating asynchronous sampling of an RF environment using the system of FIG. 4 in accordance with one embodiment of the invention.

FIG. 7 gives an example abstractedly describing for synchronous measurement process, and FIG. 8 an example for asynchronous process, to better illustrate the above principles.

Thus, in FIG. 7 an omnidirectional antenna 702 is connected to a series of parallel retrievers 704 for one band channel. Each retriever 704 is dedicated to a single channel received by antenna 702 in that band channel. At time (t), the total power (Rx) of that band channel is sampled as well as the Pilot Ec/Io for each channel's primary path. If the multipath data can be resolved and recorded by retrievers 704, then Pilot Ec/Io for each channel's primary path is replaced by Pilot Ec/Io and ($\tau$) for each multipath associated with each channel. Thus, for channel 1, a Pilot Ec/Io is obtained for the primary path or Pilot Ec/Io and ($\tau$) for each of L multipaths. At the same time, the retriever velocity (u) and GPS information of (x, y, z) is also recorded. The same also applies to each of channels 2 through N. All of these measurements comprise the first data set. Then, at time (t+$\delta$), all of the above measurements are taken again and comprise the second data set. Field data file 420 containing above information is then constructed in this fashion.

In FIG. 8, omni-directional antenna 802 is interfaced with a retriever 804 that is configured to sample each channel serially for one band channel. Thus, at time (t) the total receiver power (Rx) as well as Pilot Ec/Io for the primary path, or Pilot Ec/Io and ($\tau$) for multipaths of channel 1 in that band channel, are sampled. At time (t+$\delta$) the total receive power (Rx) as well as the Pilot Ec/Io for the primary path, or Pilot Ec/Io and ($\tau$) for multipaths associated with channel 2, are sampled. This continues until at time (t+N$\delta$) the total receive power (Rx) as well as the Pilot Ec/Io for the primary path, or Pilot Ec/Io and ($\tau$) for multipaths associated with channel N, are sampled. At time (t+(N+1)$\delta$), measurements for the next data set start again with sampling of the total power (Rx) as well as Pilot Ec/Io for the primary path, or Pilot Ec/Io and ($\tau$) for multipaths of channel 1. Thus, it can be seen that in the asynchronous case, each data set has an associated time period (T)=N$\delta$. It should be remembered, however, that with the exception of channel 1, i.e., the active channel, all other channels are actually randomly reported during the time period (T). The randomization depends on the software utilized in different designs of retriever 804.

Now that the contents of field data files 420 are clear, the equations that allow the requisite information to be abstracted therefrom in order to generate the control signals are explained. For simplicity, the following equations are for synchronous data retrieval for one band channel. The purpose of the equations is to decompose the in-band power at antenna 402 down to multipath level. Although, it must be remembered that the physical location of all power consumption in the following equations, whatever the level of decomposition, is preferably at the point between antenna 402 and the RF input circuit of retriever 404.

In the following derivations, except when explicitly indicated, all values are measured by their regular units, not in their dB format, e.g., Rx(t) is mW, not dBm; Pilot(Ec/Io) is a ratio, not dB. At an any given time (t), we can decompose Rx(t) impinged on antenna 402 and represented at A in a band channel as:

$$R_x(t) = \sum_{i=1}^{N} R_i(t) + R_{oc}(t). \quad \text{Eq. 1}$$

Where, $R_i(t)$ is the in band power from channel (i), impinging on antenna 402 and represented at A at t;

N is the total number of forward link channels in air in that band antenna; and $R_{oc}(t)$ equals the in band background noise plus external interference seen at point A.

It is worth noting that Eq.1 is a pure deterministic equation and, therefore, avoids the problems associated with the statistics in some propagation math models used in conventional simulation systems as well as in the reverse engineering approach. Such problems can be avoided because power is a superimposed scalar, provided that $R_i$ for (i=1~N) are uncorrelated. Fortunately, the electro-magnetic (EM) waves from each base station, or sector, within a given communication system are uncorrelated when they arrive at antenna 402.

Next we look at $R_i(t)$, i.e., the in band total power for a particular channel, which can be decomposed down to a plurality of sub-channels when it arrives at antenna 402. For example, in an IS-95 compliant system, the sub-channels include a number of code channels associated with each channel. The code channels include, for example, a pilot channel, a paging channel, etc. Some of these code channels are broadcast channels which are always "ON". Others are the traffic related channels, carrying messages to users distributed within the coverage areas and received by retriever 404 at time (t) along a given path. Thus, $R_i(t)$ can be given as follows:

$$R_i(t) = \sum_{j=1}^{M} W_{ij}(t). \quad \text{Eq. 2}$$

In Eq.2, $W_{ij}(t)$ is the in band power contained in sub-channel (j) associated with channel (i). There are total of M sub-channels. Here, we are particularly interested in the pilot channel (j=1). The in band power of this term is $W_{i1}(t)$. It should also be noted that Eq.2 is a deterministic equation just like Eq.1.

$R_i(t)$ can be further decomposed into its multipath components. For example, in an IS-95 compliant receiver, a rake receiver provides time diversity by tracking and adding the multipath signals using receiver "fingers." Assume L fingers are used and that each one is assigned to track a specific multipath. Assume also that each multipath arrives outside a coherence time window for the receiver so that each multipath can be independently tracked and added together, then the following deterministic equation can be obtained, which links the field information into the data reported in field data files 420:

$$R_i(t) = \sum_{k=1}^{L} P_{ik}(t) + P_{iS}(t). \quad \text{Eq. 3}$$

Where: $P_{ik}(t)$ is the in band power contained in multipath (k) associated with channel (i); and $P_{iS}$ is the missing power not reported by the retriever.

Each multipath (k) is tracked and treated by the rake receiver's $k^{th}$ correlator in an IS-95 compliant system. Thus, there are a total of L correlators in the rake receiver, which allows Ri(t) to be decomposed into maximum L elements in Eq.3. Each of the maximum L elements provides power information related to a different multipath. The missing power information represented by $P_{iS}$ comprises: correlated signals within the coherence time window; all multipath arrivals with peak number greater than L; signals that are too weak to be regarded as a viable signal for tracking; and scattering EM waves.

We know that the in band powers in the pilot channel are reported by retriever 404 through the signal treatment of $P_{ik}(t)$. Therefore, with the help of Eq.3, we can write:

$$W_{i1}(t) = \sum_{k=1}^{L} H_{i1k}(t) + H_{i1S}(t). \quad \text{Eq. 4}$$

Where: $H_{i1k}$ is the in band power of pilot channel(1), imbedded in $P_{ik}(t)$; and $H_{i1S}$ is the missing power for $H_{i1k}$, which comprises the same type of components as given for $P_{iS}$.

Next, we assume that: 1) any forward power control algorithm that may be implemented within the wireless communication system does not involve the retriever during data logging, i.e., the retriever does not get involved in any "closed loop" power control during the data logging period. 2) parameter $\eta_i$, which is defined as the ratio of total received power from channel (i) in the wireless communication system to that in the pilot channel at A, is known. Notice that $\eta_i$ may be a function of time. But within a propagation time period, it is regarded as an unchanging parameter with position within area covered by the sector, provided that the power contained in each code channel, including that due to overhead and traffic information, is omni-transmitted in the azimuth direction. This parameter can be estimated, which is explained in more detail below, or it can be provided by the system operator. These assumptions lead to Eq.5:

$$R_i(t) = \eta_i W_{i1}(t), \text{ for } i=1\sim N. \quad \text{Eq. 5}$$

Combining Eqs. 1, 2, and 5, we have:

$$\frac{R_i(t)}{R_x(t)} = \frac{\eta_i W_{i1}(t)}{\sum_{i=1}^{N} \eta_i W_{i1}(t) + R_{oc}(t)}. \quad \text{Eq. 6}$$

Eq.6 can be rewritten as:

$$R_i(t) = \frac{W_{i1}(t)}{\frac{\bar{\eta}}{\eta_i}\sum_{i=1}^{N}W_{i1}(t) + \frac{R_{oc}(t)}{\eta_i}} R_x(t), \text{ for } i = 1 \sim N. \quad \text{Eq. 7}$$

The newly weighed ratio $\bar{\eta}$ in Eq.7 is defined as $$\bar{\eta} = \frac{\sum_{i=1}^{N}\eta_i W_{i1}(t)}{\sum_{i=1}^{N}W_{i1}(t)}. \quad \text{Eq. 8}$$

Now we deal with multipaths. For a given multipath k associated with pilot channel (i) at time (t), we have $$P_{ik}(t) = \eta_i H_{ilk}(t), \text{ for } i=1\sim N \text{ and } k=1\sim L \quad \text{Eq.9}$$

Thus, $$P_{ik}(t) = \frac{H_{i1k}(t)}{\frac{\bar{\eta}'}{\eta_i}\sum_{i=1}^{N}H_{i1k}(t) + \frac{P_{is}(t)}{\eta_i}} R_i(t), \quad \text{Eq. 10}$$

for $i = 1\sim N$ and $k = 1\sim L$.

The newly weighed ratio $\bar{\eta}'$ in Eq.10 is defined as:path $$\bar{\eta}' = \frac{\sum_{k=1}^{L}\eta_i H_{i1k}(t)}{\sum_{k=1}^{L}H_{i1k}(t)}. \quad \text{Eq. 11}$$

For the Doppler frequency, we have:

$$f_m(t) = \frac{f_c}{c}u(t). \quad \text{Eq. 12}$$

Where: $f_m$(Hz) is the Doppler frequency at time (t);
$f_c$(Hz) is the carrier frequency in that band channel;
$c=3\times10^8$ (m/sec) is the speed of light; and
u (m/sec) is the retriever's velocity at time (t);

For each given time (t), there is only one $f_m$, provided that the log files record the retriever's velocity (u) along the path. Doppler frequency ($f_m$) is adopted in computer control codes for faders 412 only when the fading PSD is an important issue for the simulation of fast fading, both of the Rayleigh and Rician type.

For LOS Doppler frequency:

$$f_{Di}(t) = \frac{f_c}{c}u(t)\cos\alpha_i(t), \text{ for } i = 1\sim N. \quad \text{Eq. 13}$$

Where: $f_{Di}$ (Hz) is the LOS Doppler frequency with respect to sector (i), which provides LOS to retriever at time (t);

$\alpha_i$ is the angle between velocity vector and a line from retriever to sector (i) at time (t):

For each given time (t), the possible number of $f_{Di}$(t) is 1 to N, provided that there are possible 1 to N sectors providing LOS to retriever 404 in that band channel. The value of $f_{Di}$(t) actually defines the location of LOS peak in the fading PSD spectrum. Together with $f_m$ a complete fading PSD can be formed for Rician fading in the frequency domain. The use of Eq.13 depends on whether the LOS peak in fading PSD is an important issue during Rician fading. If the answer is yes, then $f_{Di}$(t) has to be included in the computer control codes generated for faders 412.

The parameter $\cos\alpha_i$(t) can be derived from retriever's GPS information and sector (i) GPS location information provided by service providers, both may be recorded in field data file 420. The derivation starts transforming the retriever's GPS position information of longitude (x), latitude (y), and altitude (z) to its rectangular coordinates ($x_r$, $y_r$, $z_r$) for each time (t). Then the sector (i) GPS location information (X,Y,Z) should also be transformed to its rectangular coordinates ($x_i$, $y_i$, $z_i$) for i=1~N', where, N' is the all sectors for that band channel in the communication link for simulation. Note the origin of the rectangular coordinate system is located at the center of the Earth, its z-axis is toward the North Pole, and the x-y plane is along the Equator. This procedure can be found in general GPS references, e.g., "Fundamentals of Global Positioning System Receivers" by James Bao-yen Tsui, John Wiley, NY, 2000.

Referring to FIG. 9, once the rectangular coordinates ($x_r$, $y_r$, $z_r$) of retriever 904 are obtained, together with the rectangular coordinates of sector (i) 902, ($x_i$, $y_i$, $z_i$), the direction cosines $\overline{L}_i$(t) can be derived for the line from retriever 904 to cell (i) 902 for all time (t) as:

$$\begin{pmatrix}\Delta x_i \\ \Delta y_i \\ \Delta z_i\end{pmatrix} = \begin{pmatrix}x_i \\ y_i \\ z_i\end{pmatrix} - \begin{pmatrix}x_r(t) \\ y_r(t) \\ z_r(t)\end{pmatrix}; \text{ and} \quad \text{Eq. 14}$$

$$\overline{L}_i(t) = \frac{1}{\sqrt{\Delta x_i^2 + \Delta y_i^2 + \Delta z_i^2}}\begin{pmatrix}\Delta x_i(t) \\ \Delta y_i(t) \\ \Delta z_i(t)\end{pmatrix}. \quad \text{Eq. 15}$$

In order to obtain the velocity vector of retriever 904, the retriever's path track, formed by its time varying rectangular coordinates ($x_r$, $y_r$, $z_r$) must be smoothed out to reduce the errors introduced by the position location techniques used in retriever 904. Many math tools can be used to smooth out the errors such as the commonly used software tool MATLAB. Suppose the new time varying curve after smoothing is ($\bar{x}_r$, $\bar{y}_r$, $\bar{z}_r$), then its values at time (t−δ) and (t+δ) can be used to get the retriever's velocity direction cosines $\overline{L}_u$(t) along path 908 according to the following matrix equation:

$$\begin{pmatrix}\Delta x_r \\ \Delta y_r \\ \Delta z_r\end{pmatrix} = \begin{pmatrix}\bar{x}_r(t+\delta) \\ \bar{y}_r(t+\delta) \\ \bar{z}_r(t+\delta)\end{pmatrix} - \begin{pmatrix}\bar{x}_r(t-\delta) \\ \bar{y}_r(t-\delta) \\ \bar{z}_r(t-\delta)\end{pmatrix}. \quad \text{Eq. 16}$$

Thus, $$\overline{L}_u(t) = \frac{1}{\sqrt{\Delta x_i^2 + \Delta y_i^2 + \Delta z_i^2}} \begin{pmatrix} \Delta x_r(t) \\ \Delta y_r(t) \\ \Delta z_r(t) \end{pmatrix}. \qquad \text{Eq. 17}$$

The parameter $\cos\alpha_i(t)$ for time (t) can thus be calculated according to the dot product of $\overline{L}_u(t)$ and $\overline{L}_i(t)$ as:

$$\cos\alpha_i(t) = \overline{L}_u(t) \cdot \overline{L}_i(t). \qquad \text{Eq.18}$$

Eqs.1 to 18 represent the basis that allows the required data for a band channel to be abstracted from field data files 420. In order to make this clear, an example which applies the above equations to the situation where there are only two channels, channel 1 and channel 2, in a particular band channel is provided below. But first, the following description illustrates the relationship between $H_{ilk}$ and (Pilot Ec/Io)$_{ik}$.

The following description, therefore, establish the quantitative relationship between $H_{ilk}$ and the (Pilot Ec/Io)$_{ik}$ reported in field data files 420, which is the Pilot Ec/Io for multipath k transmitted from sector (i) and measured, for example, by a Rake receiver's k$^{th}$ Finger in one band channel. First, however, the following important facts should be kept in mind: 1) All of the decomposed in band powers have been defined above including $H_{ilk}$ and 2) the physical location of these power components is located at the point between antenna 402 and the retriever's RF input circuit (not shown). Using Rx(t) as example. The calibration procedures, which are implemented for all communication devices including the retrievers, provide a linear response between the total in band power actually received at the point between antenna 402 and the retriever's RF input circuit and a Receive Signal Strength Indication (RSSI) in the devices. Therefore, the reported Rx(t) by RSSI and recorded in log files actually is the in band power at the point between antenna 402 and the retriever's RF input circuit.

Based on these facts, an equation can be derived for $H_{ilk}$ from the reported (Pilot Ec/Io)$_{ik}$. Thus, in an IS-95 compliant system for example, and for a given time (t), we have:

$$gH_{ilk}(t) = [\text{Pilot}E_c(t)]_{ik}R; \qquad \text{Eq. 19}$$

and $$g[R_x(t) + NFkT_oB] = I_oB. \qquad \text{Eq. 20}$$

Where: g is the power gain of the RF subsystem;
R is the chip rate, equal 1.2288 Mcps;
NF is the Noise Figure of the subsystems before RF interface;
$kT_o$ is the power spectral density of thermal noise;
$I_o$ is the total power spectral density; and
B is the bandwidth, equal 1.23 MHz.
From Eq. 19 and Eq. 20 we can obtain:

$$\frac{H_{ilk}(t)}{R_x(t) + NFkT_oB} = \left\{ \frac{\text{Pilot}E_c(t)}{I_o} \right\}_{ik}. \qquad \text{Eq. 21}$$

Eq. 21 can be rewritten to its dB form as:

$$H_{ilk}(t) = \left\{ \frac{\text{Pilot}E_c(t)}{I_o} \right\}_{ik} + 10\log(10^{R_x(t)/10} + 10^{N_oB/10}). \qquad \text{Eq. 22}$$

$N_oB$ (dBm) in Eq. 22 can be expressed as:

$$NF(dB) + kT_0(dBm) + B(dB) + M(dBm) = NF - 86dBm, \qquad \text{Eq. 23}$$

provided that $T_o$=300K, B=1.2288×10$^6$ Hz. Note that the field measurement for noise level shows 27 dB higher than theoretical value of $kT_0B$(dBm) due to other man made noise. This value has been included in Eq.23 as M(dBm).

At this point, the abstraction of required values from field data files 420 has been illustrated. Up to this stage, the decomposition procedure has been demonstrated, and the link between $H_{ilk}$ and (Pilot Ec/Io)$_{ik}$ has been established. This preparation leads to the next stage, i.e. for preparing the fader input parameters. The following table lists 7 steps for abstracting each required power and Doppler component to the multipath level for a band channel:

TABLE 1

| | Abstraction for a given Time (t) | |
|---|---|---|
| No Equations Used | From | To |
| 22, 23 | Rx(t), NF, [Ec|Io]$_{ik}$ | $H_{ilk}$(t) |
| 4 | $H_{ilk}$(t), $H_{i1S}$(t) | $W_{i1}$(t) |
| 7 | $W_{i1}$(t), Rx(t), $\eta_i$, $R_{oc}$(t) | $R_i$(t) |
| 10 | $H_{ilk}$(t), $R_i$(t), $\eta_i$, $P_{is}$(t) | $P_{ik}$(t) |
| 12 | u, $f_c$ | $f_m$ |
| 13, 14~18 | u, $f_c$, ($x_r$, $y_r$, $z_r$), ($x_i$, $y_i$, $z_i$) | $f_{Di}$ |
| (Directly from log files 406) | (Field data file 420) | $\tau_{ik}$ |

In Table 1, indexes i, j, k are reserved for RF channels, or sectors in ($x_i$, $y_i$, $z_i$) sub-channels, and multipaths, respectively. Additionally, $\tau_{ik}$ is time delay for multipath k, where k=1~L within the RF channel i, where i=1~N. All powers are within the bandwidth (B), which is 1.2288 MHz for example for an IS-95 compliant system, at a given time (t). And N and L are also time varying parameters, except for the sectors GPS information, where, the total sector number N' is a fixed number for a pre-designed communication link in simulation.

All RF fading information is thus saved into these in band powers, delay time, and Doppler components for one band channel, which can be abstracted by the software running on computer 408 using the 7 steps listed in table 1. Same results can be obtained for each band channels separately. The next stage is to generate the computer control codes for configuring faders 412. But before this process is described, an example illustrating the principles of abstraction described above is presented for the simplest case of two pilot channels in one band channel.

In following explanation, detailed math is omitted. The emphasis is focused instead on the physical picture. For the case of two IS-95 RF channels, or two cells, or sectors, Cell(1) and Cell(2) and for a given time (t), assume Rx is the total power received by antenna 402 and it consists of $R_1$, $R_2$ transmitted by Cell(1) and Cell(2), respectively.

When retrievers 404 only records the primary path information to its log files, the multipath index k=1, or it can be omitted. Since we are only dealing with the Pilot Channel, the index for code channel j can also be omitted. Thus, we have the following equations:

$$R_x(t) = R_1(t) + R_2(t) + R_{oc}; \qquad \text{Eq. 24}$$

$$W_i(t) = H_i(t) + H_{iS}, \text{ for i=1, 2; and} \qquad \text{Eq.25}$$

$$R_i(t) = \eta_i W_i(t) \approx \eta_n H_i(t), \text{ for i=1, 2.} \qquad \text{Eq.26}$$

Therefore:

$$R_1(t) \approx \frac{H_1(t)}{\left[H_1(t) + \frac{\eta_2}{\eta_1}H_2(t) + \frac{1}{\eta_1}R_{oc}\right]} R_x(t); \text{ and} \qquad \text{Eq. 27}$$

$$R_2(t) \approx \frac{H_2(t)}{\left[\frac{\eta_1}{\eta_2}H_1(t) + H_2(t) + \frac{1}{\eta_2}R_{oc}\right]} R_x(t). \qquad \text{Eq. 28}$$

Where: $R_j$, $R_2$ are the received IS-95 channel powers from Cell(1) and Cell(2) respectively;

$R_{oc}$ is the interference from sources other than Cell(1) and Cell(2);

$H_1$, $H_2$ are the pilot power contained in $R_1$, $R_2$ respectively; and $\eta_1$, $\eta_2$ are the ratio of received IS-95 channel power vs. received pilot power from Cell(1) and Cell(2), respectively.

There is no further power partitioning for the multipath power components in this example beyond $R_1$ and $R_2$ obtained by Eq.27 and 28. This is because only primary path's [PilotEc/Io]$_i$ (i=1, 2) are considered. Thus, $H_1$, $H_2$ can be calculated quantitatively from the measured [PilotEc/Io]$_i$ (i=1, 2) respectively by using Eq.22 and Eq.23.

From the above equations, the following can be noted. First, term $R_{oc}$ in the denominator of Eq.27 & 28 is a highly randomized, unpredictable variable. It consists of all interference originated from non-IS-95 sources, e.g., man made jamming, noises from other electronics, etc. $R_{oc}$ can be negligible in comparison with rest of the terms in the denominators of Eq.27 & 28, provided that the log files are collected in the field with the least interference from the sources other than Cell(1) and Cell(2) in the band of interesting. Second, $\eta_1$, $\eta_2$ are greater than 1 due to the many sub-channels using coexisting in a RF channel. Thus, the term $R_{oc}/\eta_i$ (i=1, 2) in Eq.27 & 28 is much smaller than the rest of the terms in the denominators of Eq.27 & 28.

Thus, Eq.27 & 28 can be simplified to:

$$R_1(t) \approx \frac{H_1(t)}{H_1(t) + \frac{\eta_2}{\eta_1}H_2(t)} R_x(t); \text{ and} \qquad \text{Eq. 29}$$

$$R_2(t) \approx \frac{H_2(t)}{\frac{\eta_1}{\eta_2}H_1(t) + H_2(t)} R_x(t). \qquad \text{Eq. 30}$$

A third thing to notice is that $\eta_1$ and $\eta_2$ are defined at the receiving end, i.e., at antenna 402. But their values do not change with propagation from Cell(1) and Cell(2) to antenna 402. Therefore, $\eta_1$ and $\eta_2$ at antenna 402 are also the same ratios as are present at Cell(1) and Cell(2) when the signals are transmitted and which are controlled by the system operators at Cell(1) and Cell(2). If $\Delta t_1$ and $\Delta t_2$ represent the propagation time from Cell(1) and Cell(2) to retrievers 404 respectively, then the time variation of $\eta_1$ and $\eta_2$ can be analyzed at Cell(1) and Cell(2) by adding only a time shift $\Delta t_1$ and $\Delta t_2$ to $\eta_1$ and $\eta_n$ respectively.

Fourth, the values of $\eta_1$ and $\eta_2$ vary with time, depending on various factors related to the fact that the forward power varies with time. For example, in an IS-95B compliant system, the ratios vary with time when the number of paging and traffic channels changed with time, as well as the number of SCCH. In an IS2000 compliant system, the power in the forward link also varies with the activity of FCH, SCH, SCCH, and DCCH. Other factors affecting the ratios include voice activity on each traffic related channel; the performance of the MAC layer for FCH, SCH, DCCH in an IS2000 compliant system; the number of slots and power levels in each paging channel; and finally the power control implemented by Cell(1) and Cell(2) for the respective forward link traffic channels. Thus, the time-varying values of $\eta_1$ and $\eta_2$ are up to the infrastructure vendors supplying Cell(1) and Cell(2) to the system operators and the daily operating status of Cell(1) and Cell(2) and is, therefore, proprietary.

Therefore, a solution of Eq. 29 & 30 can be based on time-varying values for $\eta_1$ and $\eta_2$ provided by the service providers or it can be estimated. But there is no analytical way to figure out $\eta_1$ and $\eta_2$ exactly.

If the values are going to be estimated, then to a first degree of approximation, it can be assumed that:

$$\eta_1 = \eta_2 \qquad \text{Eq.31}$$

And Eq. 29 & 30 become:

$$R_1(t) \approx \frac{H_1(t)}{H_1(t) + H_2(t)} R_x(t); \text{ and} \qquad \text{Eq. 32}$$

$$R_2(t) \approx \frac{H_2(t)}{H_1(t) + H_2(t)} R_x(t). \qquad \text{Eq. 33}$$

As explained above, Rx(t), $H_1$(t), and $H_2$(t) are obtained directly from field data files 420 with some calculation through Eq.22 & 23. Thus, $R_1$(t) can be easily obtained from field data files 420 by software running, for example, on computer 408. The same is true for $R_2$(t). Computer control codes can then be generated to control fader 412 so as to recreate $R_1$(t) and $R_2$(t) at point B.

Another benefit that can be derived using the systems and methods described herein is that the propagation, or radio channel properties for a particular communication channel can be fully described by, or abstracted from field data files 420. The ability to fully describe the propagation properties is, for example, very important for propagation simulation, service providers, wireless system and antenna researchers and designers. The propagation property can be obtained as follows: If the power transmitted from Cell(i) is $R_{io}$ at t=t−τ, where τ is the transmission time between Cell(i) and a wireless communication device, such as a retriever 404, then the propagation properties for a particular channel, i.e., between Cell(i) and the device at t in terms of total power attenuation, $I_i$(t), and path k power attenuation $Q_{ik}$(t), can be fully described by the following dB equations:

$$I_i(t) = W_{i1}(t) + R_x(t) - \frac{\bar{\eta}}{\eta_i}\sum_{i=1}^{N}W_{i1} - R_{io}(t-\tau), \qquad \text{Eq. 34}$$

for $i = 1 \sim N$; and $$Q_{ik}(t) = H_{i1k}(t) + R_i(t) - \frac{\bar{\eta}}{\eta_i}\sum_{k=1}^{L}H_{i1k} - R_{io}(t-\tau), \qquad \text{Eq. 35}$$

for $i = 1 \sim N$, $k = 1 \sim L$.

Note the unit of power in Eq. 34 & 35 is dBm. $W_{il}$(t) in Eq. 34 and $H_{ilk}$(t), $R_i$(t) in Eq.35 can be derived by Eq.4, 7, & 22 from the data in field data files 420 respectively, and $\bar{\eta}$, $\bar{\eta}'$ can be calculated based on service providers $\eta_i$(t) data. From Eq. 34 & 35 it can be seen that the fading properties in terms of channel and multipath power attenuation for a particular channel (i) can be fully, determinably described by $I_i$(dB) vs. time and $Q_{ik}$(dB) vs. time, with no need of any statistical treatment. Again, this capability is advantageous for such endeavors as propagation simulation, and to service providers, wireless system/antenna researchers, and designers, because it is more realistic and reliable than conventional and the channel sounding methods.

Now that the required values are abstracted from field data files 420, the next step is to generate computer control codes that can be used to configure faders 412. The following description illustrates one example process by which such signals can be generated for one band channel. The following description refers back to FIG. 6. Thus, the objective is to derive control signals that will supply values for major attenuator 603 (MaA), minor attenuator 634 (MiA), fading module 614, and delayer 624 for a given time (t), provided that $R_i(t)$, $P_{ik}(t)$, $f_m(t)$, $f_{Di}(t)$, and $\tau_{ik}(t)$ are given for i=1~N, k=1~L for a particular band channel. Note that all following equations are in dB form.

First, define that, for i=1~N, k=1~L:

$A_i(t)$ is the value of MaA 603;

$B_{ik}(t)$ is the value of MiA 634;

$C_{ik}$ is time independent, individually calibrated loss for path k, i.e., from 608 to 610 cross duplex 418 to point B through path k only in channel i for Conductive Test Mode (not shown in FIG. 6). In Radiative Test Mode, point B is located at device 414's antenna to its RF front end in FIG. 4;

$C_i$ is time independent, calibrated loss for channel i only, i.e., from 608 to 610 cross duplex 418 to point B through all multipaths in channel i for Conductive Test Mode (not shown in FIG. 6). In Radiative Test Mode, point B is located at device 414's antenna to its RF front end in FIG. 4;

$D_{ik}(t)$ is the value of delayer 624;

$R_{io}$ is adjustable, time independent output in band power from base station emulator 612 at 608 for that band channel;

$R_m$ is the single biggest channel power within $R_i(t)$ for all time, all channel;

$P_m$ is the single biggest path power within $P_{ik}(t)$ for all time, all channel, and all path.

First we deal with Case A where only the primary path for each channel i is treated. In this case, the systems and methods described herein provide $R_i(t)$ for i=1~N. All multipath functions in channel i, such as path 604, are then useless except as signal paths for all channels, i.e., i=1~N. $R_{io}$ is adjusted, and its value selected in such a way as to meet the following condition:

$R_{i0} > R_m + C_i$, for $i=1\sim N$.  Eq.36

Next, set up the value of MiA 634:

$B_{ik}(t)=0$, for $i=1\sim N, k=1\sim L$.  Eq.37

Thus, the time varying value of MaA 603 can be obtained using:

$A_i(t)=R_{i0}-C_i-R_i(t)$, for $i=1\sim N$.  Eq.38

Eq.36~38 together make the output power from channel (i) at 610 being $R_i(t)$. Note that Eq.1 has guaranteed that the summation of $R_i(t)$ is equal to Rx(t). Thus without any need to program fading module 614, i.e., without the help of any fading statistical models, the fading behavior in terms of channel power is completely simulated in a time varying manner. The only requirement for Case A, as well as for Case B & C, is that fader 600 has dynamic control on MaA 603.

Next we deal with Case B where the primary path in each channel i is treated, and fading PSD for both Rayleigh and Rician fading are important and must be included in the simulation. In this case, the systems and methods described herein provide $f_m(t)$ and $R_i(t)$ for i=1~N. Due to limitations of conventional commercial faders, the fast fading ripples in both the Rayleigh and Rician fading data are preferably smoothed out in $R_i(t)$ for Case B. All multipaths except path k are closed for all channels, i.e., i=1~N. For simplicity, path 1 is here selected as path k, but remember that any path in channel (i) can be selected to function as path k. $R_{io}$ is adjusted and selected so that the following condition is met $R_{i0} > R_m + C_{i1}$, for $i=1\sim N$.  Eq.39

Next, set up the value of MiA 634:

$B_{i1}(t)=0$, for $i=1\sim N$.  Eq.40

Thus, the time varying value of MaA 603 can be obtained using:

$A_i(t)=R_{i0}-C_{i1}-R_i(t)$; for $i=1\sim N$.  Eq.41

To account for the fast fading, either Rayleigh or Rician, $f_m(t)$ is injected into fading module 614 in path 1. Thus, the fast fading signals are recreated and superimposed onto each $R_i(t)$. A classic 6 dB model also preferably injected into fading module 614. This model together with $f_m(t)$ forms the required fading PSD. The selection of Rayleigh or Rician fading, which is superimposed onto each $R_i(t)$ for any particular time slot, must be determined prior to when programming fading module 614 in path 1. This can be done by visual verification of the field data, such as [PilotEc/Io]$_i$ and $R_i(t)$ for each particular time slot.

Case C is similar to Case B except that the LOS Doppler shift for Rician fading has to be included in the simulation. Thus the systems and methods described herein provide $f_m(t)$, $f_{Di}(t)$ and $R_i(t)$ for i=1~N. Eq.39, 40, & 41 are still valid and thus, can be applied in Case C for all MaA 603 and MiA 634 setting. For fast fading and fading PSD, $f_m(t)$ is an input to fading module 614 in path 1, $f_{Di}(t)$ also is input to fading module 614 in path 1 in order to recreate a LOS peak in the fading PSD during the Rician fading period.

In Case D, the multipath for each channel i is treated. In this case, the systems and methods described herein provide $P_{ik}(t)$ and $\tau_{ik}(t)$ for i=1~N, k=1~L. All multipaths in channel i, such as path 604, are open for all channels, i.e., i=1~N. $R_{io}$ is adjusted and its value selected so that following condition is met $R_{i0}-L > P_m + C_{ik}$, for $i=1\sim N$.  Eq.42

Next, set up the value of MaA 603:

$A_i(t)=0$, for $i=1\sim N$.  Eq.43

Thus the time varying value of MiA 634 for all multiple path:

$B_{ik}(t)=R_{i0}-L-C_{ik}-P_{ik}(t)$, for $i=1\sim N, k=1\sim L$.  Eq.44

For delayer 624:

$D_{ik}(t)=\tau_{ik}(t)$, for $i=1\sim N, k=1\sim L$.  Eq.45

Eq.42~44 together make the output power from path k in channel (i) at 610 being $P_{ik}(t)$ for i=1~N, k=1~L. Note that Eq.3 & 1 have guaranteed that the summations of $P_{ik}(t)$ and $R_i(t)$ yield $R_i(t)$ and Rx(t), respectively. Thus, as in Case A, fading behaviors in terms of channel and multipath powers are completely simulated in time varying manner without the help of any fading statistical models. In Case D & E, fader 600 preferably has dynamic control of MiA 634 and Delayer 624.

In Case A and D, the functions of fading module 614 in fader 600 do not add anything. Thus, all fading modules 614 can be omitted in the fader design and construction, provided that Case A or D is the selected simulation project. This conclusion tremendously simplifies fader design, thus reducing the cost of equipment investment for both the fader manufacturers and its users.

Finally, Case E, where the multipaths power fading together with the fading PSD and LOS peak are all included in the simulation. In this case, the systems and methods described herein provide $P_{ik}(t)$, $\tau_{ik}(t)$ and $f_m(t)$, $f_{Di}(t)$ for i=1~N, k=1~L. Eq.42, 43, 44, & 45 in Case D can be adopted here without any changes. But remember that the fast fading power ripples due to the Rayleigh or Rician fading in each multipath have been smoothed out, thus $f_m(t)$ is preferably fed back into fading module 614 in each multipaths to recreate the Rayleigh and Rician fading together with fading PSD. For each multipath in all channel i, if Rician fading is present, $f_{Di}(t)$ has to be added to the multipath's fading module 614, to recreate a LOS peak in the fading PSD. Table 2 summarizes Cases A-E.

less of the type of device being manufactured/tested. Accordingly, while embodiments and implementations of the invention have been shown and described, it should be apparent that many more embodiments and implementations are within the scope of the invention. Accordingly, the invention is not to be restricted, except in light of the claims and their equivalents.

What is claimed:

1. A method for simulating a wireless communication link, comprising:
   recording data related to a plurality of wireless communication link parameters over a predetermined time period;
   generating a field data file from the recorded data;
   obtaining a plurality of channel parameters from the field data file for a plurality of communication channels;

TABLE 2

Abstraction for a given Time (t)

| Eq. Used | From | To | Fading Simulation Note |
|---|---|---|---|
| Case A: | | | |
| 36, 37, 38 | $R_i(t)$, $R_{io}$, $C_i$ | $A_i(t)$, $B_{ik}$ | All power fading by $A_i(t)$, $B_{ik}$; Primary path only & no fading PSD; |
| Case B: | | | |
| 39, 40, 41 | $R_i(t)$, $R_{io}$, $C_{i1}$ | $A_i(t)$, $B_{ik}$, | Slow fading & path loss by $A_i(t)$, $B_{ik}$; Primary path only; |
| | $f_m$ | Module 614 | Fast & fading PSD by fader with $f_m$; |
| Case C: | | | |
| 39, 40, 41 | $R_i(t)$, $R_{io}$, $C_{i1}$ | $A_i(t)$, $B_{ik}$, | Slow fading & path loss by $A_i(t)$, $B_{ik}$; Primary path only; |
| | $f_m$ | Module 614 | Fast & fading PSD by fader with $f_m$; |
| | $f_{Di}$ | | LOS peak in PSD by fader with $f_{Di}$; |
| Case D: | | | |
| 42, 43, 44, 45 | $P_{ik}(t)$, $R_{io}$, $C_{ik}$, $\tau_{ik}(t)$ | $A_i$, $B_{ik}(t)$, $D_{ik}(t)$ | All power fading by $A_i$, $B_{ik}(t)$, including multipath fading & delay; No fading PSD; |
| Case E: | | | |
| 42, 43, 44, 45 | $P_{ik}(t)$, $R_{io}$, $C_{ik}$, $\tau_{ik}(t)$ | $A_i$, $B_{ik}(t)$, $D_{ik}(t)$ | Slow fading & path loss by $A_i$, $B_{ik}(t)$, including multipath & delay; |
| | $f_m$ | Module 614 | Fast & fading PSD by fader with $f_m$; |
| | $f_{Di}$ | | LOS peak in PSD by fader with $f_{Di}$; |

In Table 2, the calibrated losses $C_{ik}$ and $C_i$, i=1~N, k=1~L in general depend on the band channel, and are also the function of the values of $B_{ik}$, $A_i$, respectively. Thus all calibration curves of $C_{ik}$ versus $B_{ik}$ and $C_i$ versus $A_i$ must be obtained for each band channel prior any calculation by using Equations 36, 38, 39, 41, 42, 44, provided that the devices are under Conductive Test Mode. Same calibration curves must also be obtained for Radiative Test Mode, in which the calibration curves are different from that in Conductive Test Mode. That is because the transmission antenna's gain, free space loss, and device's receiver antenna gain have to be included in the values of calibrated losses $C_{ik}$ and $C_i$, i=1~N, k=1~L.

Thus, it can be seen that the systems and methods described herein provide for fast, efficient, and reliable simulation of an RF environment in a test facility, which provides numerous benefits. Further, the systems and methods described are not limited to specific air interface standards or frequency ranges. Therefore, the advantages described can be obtained, regardspecifying portions of the plurality of channel parameters that exhibit receiver challenging propagation conditions;
generating control codes based on the specified portions of the plurality of channel parameters; and
controlling channel simulators with the control codes, the channel simulators configured to simulate the wireless communication link.

2. The method of claim 1, wherein the receiver challenging propagation conditions comprise fading conditions.

3. The method of claim 1, wherein the receiver challenging propagation conditions comprise hard hand off conditions.

4. The method of claim 1, wherein the receiver challenging propagation conditions comprise soft hand off conditions.

5. The method of claim 1, wherein the receiver challenging propagation conditions comprise delay spreading conditions.

6. The method of claim 1, wherein recording the data related to a plurality of wireless communication link parameters comprises recording a total received power and a received ratio of pilot signal energy per chip versus total power spectral density and a path delay for each of a plurality of multipaths in each of the plurality of communication channels over the predetermined time period.

7. The method of claim 6, wherein obtaining the plurality of channel parameters comprises using the recorded total received power, the recorded ratios of pilot energy per chip versus total power spectral density, and ratios of received channel power versus pilot power for each of the plurality of communication channels to obtain the plurality of channel parameters for each of the plurality of communication channels.

8. The method of claim 7, further comprising estimating the ratios of received channel power versus pilot power for each of the plurality of communication channels.

9. The method of claim 7, wherein the ratios of received channel power versus pilot power for each of the plurality of communication channels is provided by a system operator.

10. The method of claim 1, wherein obtaining a plurality of channel parameters comprises obtaining Doppler frequency, and Line of Sight (LOS) Doppler frequency for each of the plurality of communication channels over the predetermined time period.

11. The method of claim 10, wherein generating the control codes comprises:
generating calibration curves for base station emulators, the channel simulators, and connections between the base station emulators and the channel simulators; and
using the calibration curves and the specified portions of the plurality of channel parameters to generate the control codes.

12. The method of claim 11, further comprising removing fast fading parameters from the specified portions of the plurality of channel parameters obtained for each of the plurality of communication channels.

13. The method of claim 12, wherein generating the control codes further comprises using the calibration curves, the specified portions of the plurality of channel parameters with fast fading parameters removed, the Doppler frequency, and the LOS Doppler frequency to generate the control codes.

14. The method of claim 13, wherein generating the control codes further comprises generating calibration curves for a transmission antenna, a receiving antenna, an antenna anechoic chamber, and connections between the base station emulators, the channel simulators and the transmission antenna.

15. The method of claim 6, wherein obtaining the plurality of channel parameters further comprises using the recorded total received power, the recorded ratios of pilot energy per chip versus total power spectral density, and ratios of received channel power versus pilot power to obtain multipath component parameters for each of the plurality of multipaths in each of the plurality of communication channels.

16. The method of claim 15, further comprising specifying portions of the multipath component parameters that exhibit at least one of fading and hand-off conditions.

17. The method of claim 16, further comprising removing fast fading parameters from the specified portions of the multipath component parameters for each of the plurality of multipaths in each of the plurality of communication channels.

18. The method of claim 17, wherein generating the control codes comprises:
generating multipath calibration curves for base station emulators, the channel simulators, and connections between the base station emulators and the channel simulators; and
using the multipath calibration curves, the specified portions of the multipath component parameters, and the path delays to generate the control codes.

19. The method of claim 18, wherein obtaining a plurality of channel parameters comprises obtaining Doppler frequency, and Line of Sight (LOS) Doppler frequency of each of the plurality of communication channels over the predetermined time period.

20. The method of claim 19, wherein generating the control codes further comprises using the multipath calibration curves, the specified portions of the multipath component parameters with fast fading signals removed, the Doppler frequency, the LOS Doppler frequency, and the path delays to generate the control codes.

21. The method of claim 18, wherein generating the control codes further comprises generating multipath calibration curves for a transmission antenna, a receiving antenna, an antenna anechoic chamber, and connections between the base station emulators, the channel simulators and the transmission antenna.

22. The method of claim 1, wherein recording the data related to a plurality of wireless communication link parameters comprises recording a velocity of a retriever capturing the data; recording retriever Global Positioning Satellite (GPS) information and recording base station GPS information of a base station over the predetermined time period.

23. The method of claim 1, wherein recording the data is performed asynchronously or synchronously.

24. The method of claim 1, further comprising controlling at least one of the following using the control codes: an attenuator and a delayer, without the use of any fading modules.

25. The method of claim 1, further comprising controlling at least one of the following using the control codes: an attenuator, a delayer, and a fading module.

26. A computer readable medium having stored thereon one or more sequences of instructions for causing a computer to perform the processing steps required to generate control signals for simulating a wireless communication link, the processing steps comprising:
recording data related to a plurality of wireless communication link parameters over a predetermined time period;
generating a field data file from the recorded data;
obtaining a plurality of channel parameters from the field data file for a plurality of communication channels;
specifying portions of the plurality of channel parameters that exhibit receiver challenging propagation conditions;
generating control codes based on the specified portions of the plurality of channel parameters; and
controlling channel simulators with the control codes, the channel simulators configured to simulate the wireless communication link.

27. The computer readable medium of claim 26, wherein the receiver challenging propagation conditions comprise fading conditions.

28. The computer readable medium of claim 26, wherein the receiver challenging propagation conditions comprise hard hand off conditions.

29. The computer readable medium of claim 26, wherein the receiver challenging propagation conditions comprise soft hand off conditions.

30. The computer readable medium of claim 26, wherein the receiver challenging propagation conditions comprise delay spreading conditions.

31. The computer readable medium of claim 26, wherein the step of recording the data related to a plurality of wireless communication link parameters comprises recording a total received power and a received ratio of pilot signal energy per chip versus total power spectral density and a path delay for each of a plurality of multipaths in each of the plurality of communication channels over the predetermined time period.

32. The computer readable medium of claim 31, wherein the step of obtaining the plurality of channel parameters comprises using the recorded total received power, the recorded ratios of pilot energy per chip versus total power spectral density, and ratios of received channel power versus pilot power for each of the plurality of communication channels to obtain the plurality of channel parameters for each of the plurality of communication channels.

33. The computer readable medium of claim 32, wherein the processing steps further comprise estimating the ratios of received channel power versus pilot power for each of the plurality of communication channels.

34. The computer readable medium of claim 32, wherein the ratios of received channel power versus pilot power for each of the plurality of communication channels are provided by a system operator.

35. The computer readable medium of claim 26, wherein the step of obtaining a plurality of channel parameters comprises obtaining Doppler frequency, and Line Of Sight (LOS) Doppler frequency for each of the plurality of communication channels over the predetermined time period.

36. The computer readable medium of claim 35, wherein the step of generating the control codes comprises:
generating calibration curves for base station emulators, the channel simulators, and connections between the base station emulators and the channel simulators; and
using the calibration curves and the specified portions of the plurality of channel parameters to generate the control codes.

37. The computer readable medium of claim 36, wherein the processing steps further comprise removing fast fading parameters from the specified portions of the plurality of channel parameters for each of the plurality of communication channels.

38. The computer readable medium of claim 37, wherein the step of generating the control codes further comprises using the calibration curves, the specified portions of the plurality of channel parameters with fast fading parameters removed, the Doppler frequency, and the Line Of Sight (LOS) Doppler frequency to generate the control codes.

39. The computer readable medium of claim 36, wherein the step of generating the control codes further comprises generating calibration curves for a transmission antenna, a receiving antenna, an antenna anechoic chamber, and connections between the base station emulators, the channel simulators and the transmission antenna.

40. The computer readable medium of claim 31, wherein the step of obtaining the plurality of channel parameters further comprises using the recorded total received power, the recorded ratios of pilot energy per chip versus total power spectral density, and ratios of received channel power versus pilot power to obtain multipath component parameters for each of the plurality of multipaths in each of the plurality of communication channels.

41. The computer readable medium of claim 40, wherein the processing steps further comprise specifying portions of the multipath component parameters that exhibit at least one of a fading condition and a hand-off condition.

42. The computer readable medium of claim 41, wherein the processing steps further comprise removing fast fading parameters from the specified portions of the multipath component parameters for each of the plurality of multipaths in each of the plurality of communication channels.

43. The computer readable medium of claim 42, wherein the step of generating the control codes comprises:
generating multipath calibration curves for base station emulators, the channel simulators, and connections between the base station emulators and the channel simulators; and
using the multipath calibration curves, the specified portions of the multipath component parameters, and the path delays to generate the control codes.

44. The computer readable medium of claim 43, wherein the step of obtaining a plurality of channel parameters comprises obtaining Doppler frequency, and Line Of Sight (LOS) Doppler frequency for each of the plurality of communication channels over the predetermined time period.

45. The computer readable medium of claim 44, wherein the step of generating the control codes further comprises using the multipath calibration curves, the specified portions of the multipath component parameters with fast fading signals removed, the Doppler frequency, the Line Of Sight (LOS) Doppler frequency, and the path delays to generate the control codes.

46. The computer readable medium of claim 43, wherein the step of generating the control codes further comprises generating multipath calibration curves for a transmission antenna, a receiving antenna, an antenna anechoic chamber, and connections between the base station emulators, the channel simulators and the transmission antenna.

47. The computer readable medium of claim 26, wherein the step of recording the wireless communication link data comprises recording a velocity of a retriever capturing the data; recording retriever Global Positioning Satellite (GPS) information and recording base station GPS information of a base station over the predetermined time period.

48. The computer readable medium of claim 26, wherein the step of recording the data is performed asynchronously or synchronously.

49. The computer readable medium of claim 26, wherein the processing steps further comprise controlling at least one of the following using the control codes: an attenuator, and a delayer, without the use of any fading modules.

50. The computer readable medium of claim 26, wherein the processing steps further comprise controlling at least one of the following using the control codes: an attenuator, a delayer, and a fading module.

51. A system for generating control signals for simulating a wireless communication link, the system comprising:
a retriever configured to record data related to a plurality of wireless communication link parameters over a time period; and
a computer configured to:
generate a field data file from recorded data related to a plurality of wireless communication link parameters over a predetermined time period;
obtain a plurality of channel parameters from the field data file for a plurality of communication channels;
specify portions of the plurality of channel parameters that exhibit receiver propagation conditions;
generate control codes based on the specified portions of the plurality of channel parameters; and
a plurality of channel simulators responsive to the control codes simulate the wireless communication link.

52. The system of claim 51, wherein the recorded data comprises a total received power and a received ratio of pilot signal energy per chip versus total power spectral density and a path delay for each of a plurality of multipaths in each of the plurality of communication channels over the predetermined time period.

53. The system of claim 52, wherein the computer is configured to obtain the plurality of channel parameters by using the recorded total received power, the recorded ratios of pilot energy per chip versus total power spectral density, and ratios of received channel power versus pilot power for each of the plurality of communication channels.

54. The system of claim 53, wherein the computer is further configured to estimate the ratios of received channel power versus pilot power for each of the plurality of communication channels.

55. The system of claim 53, wherein the ratios of received channel power versus pilot power for each of the plurality of communication channels is provided by a system operator.

56. The system of claim 51, wherein the computer is configured to obtain the plurality of channel parameters by obtaining Doppler frequency, and Line Of Sight (LOS) Doppler frequency for each of the plurality of communication channels over the predetermined time period.

57. The system of claim 56, wherein the computer is configured to generate the control codes by:
receiving calibration curves for base station emulators, the channel simulators, and connections between the base station emulators and the channel simulators; and
using the calibration curves and the specified portions of the plurality of channel parameters to generate the control codes.

58. The system of claim 57, wherein the computer is further configured to remove fast fading parameters from the specified portions of the plurality of channel parameters obtained for each of the plurality of communication channels.

59. The system of claim 58, wherein the computer is configured to generate the control codes by using the calibration curves, the specified portions of the plurality of channel parameters with fast fading parameters removed, the Doppler frequency, and the LOS Doppler frequency to generate the control codes.

60. The system of claim 57, wherein the computer is configured to generate the control codes by receiving calibration curves for a transmission antenna, a receiving antenna, an antenna anechoic chamber, and connections between the base station emulators, the channel simulators and the transmission antenna.

61. The system of claim 52, wherein the computer is configured to obtain the plurality of channel parameters by using the recorded total received power, the recorded ratios of pilot energy per chip versus total power spectral density, and ratios of received channel power versus pilot power to obtain multipath component parameters for each of the plurality of multipaths in each of the plurality of communication channels.

62. The system of claim 61, wherein the computer is further configured to specify portions of the multipath component parameters that exhibit at least one of a fading condition and a hand-off condition.

63. The system of claim 62, wherein the computer is further configured to remove fast fading parameters from the specified portions of the multipath component parameters for each of the plurality of multipaths in each of the plurality of communication channels.

64. The system of claim 63, wherein the computer is configured to generate the control codes by:
receiving multipath calibration curves for base station emulators, the channel simulators, and connections between the base station emulators and the channel simulators; and
using the multipath calibration curves, the specified portions of the multipath component parameters, and the path delays to generate the control codes.

65. The system of claim 64, wherein the computer is configured to obtain the plurality of channel parameters by obtaining Doppler frequency, and Line Of Sight (LOS) Doppler frequency for each of the plurality of communication channels over the predetermined time period.

66. The system of claim 65, wherein the computer is configured to generate the control codes by using the multipath calibration curves, the specified portions of the multipath component parameters with fast fading signals removed, the Doppler frequency, the LOS Doppler frequency, and the path delays to generate the control codes.

67. The system of claim 62, wherein the computer is configured to generate the control codes based on multipath calibration curves for a transmission antenna, a receiving antenna, an antenna anechoic chamber, and connections between the base station emulators, the channel simulators and the transmission antenna.

68. The system of claim 51, wherein the retriever is configured to record the data related to a plurality of wireless communication link parameters by recording a velocity of the retriever and retriever Global Positioning Satellite (GPS) information of the retriever and recording base station GPS information over the predetermined time period.

69. The system of claim 51, wherein the retriever is configured to record the data asynchronously.

70. The system of claim 51, wherein the computer is further configured to control at least one of the following using the control codes: an attenuator, and a delayer, without the use of any fading modules.

71. The system of claim 51, wherein the computer is further configured to control at least one of the following using the control codes: an attenuator, a delayer, and a fading module.

72. The system of claim 51, wherein the receiver propagation conditions comprise fading.

73. The system of claim 51, wherein the receiver propagation conditions comprise hard hand off conditions.

74. The system of claim 51, wherein the receiver propagation conditions comprise soft hand off conditions.

75. The system of claim 51, wherein the receiver propagation conditions comprise delay spreading.

* * * * *